United States Patent
Kimura

(10) Patent No.: US 6,665,130 B2
(45) Date of Patent: Dec. 16, 2003

(54) OBJECTIVE LENS, OPTICAL PICKUP APPARATUS AND RECORDING AND/OR REPRODUCING APPARATUS

(75) Inventor: Tohru Kimura, Hachioji (JP)

(73) Assignee: Konica Corporation, Tokyo (JP)

(*) Notice: Subject to any disclaimer, the term of this patent is extended or adjusted under 35 U.S.C. 154(b) by 0 days.

(21) Appl. No.: 10/171,344

(22) Filed: Jun. 13, 2002

(65) Prior Publication Data

US 2003/0128440 A1 Jul. 10, 2003

(30) Foreign Application Priority Data

Jun. 20, 2001 (JP) .................................... 2001/185961
Sep. 19, 2001 (JP) .................................... 2001/284408
Oct. 29, 2001 (JP) .................................... 2001/330606

(51) Int. Cl.$^7$ ................ G02B 13/24; G02B 9/00; G11B 7/135; G11B 7/00
(52) U.S. Cl. .............. 359/719; 359/718; 359/796; 369/112.12; 369/112.73
(58) Field of Search ................ 359/661, 664, 359/718, 719, 796; 369/112.11, 112.12, 112.13, 112.23, 112.24

(56) References Cited

U.S. PATENT DOCUMENTS 6,243,350 B1 * 6/2001 Knight et al. ............... 369/126

* cited by examiner

Primary Examiner—David N. Spector
(74) Attorney, Agent, or Firm—Finnegan, Henderson, Farabow, Garrett & Dunner, L.L.P.

(57) ABSTRACT

An objective lens for recording and/or reproducing information of an optical information recording medium, comprises a first lens group having a positive refractive power; and a second lens group having a positive refractive power. The first and second lens groups are arranged in this order from a light source side of the objective lens and are made of a plastic material respectively; and the following formula is satisfied:

$$NA > 0.85$$

where NA is a necessary image side numerical aperture for recording or reproducing information of the optical information recording medium.

38 Claims, 24 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

OBJECTIVE LENS, OPTICAL PICKUP APPARATUS AND RECORDING AND/OR REPRODUCING APPARATUS

BACKGROUND OF THE INVENTION

The present invention relates to an objective lens for at least one of recording and reproducing of information of an optical information recording medium, an optical pickup apparatus including the objective lens and a recording and/or reproducing apparatus including the optical pickup apparatus.

In recent years, there have been advanced research and development activities for a novel high density recording optical pickup system employing a light source such as a violet semiconductor laser with an oscillation wavelength of about 400 nm or a violet SHG laser and a two-group-structured objective lens whose numerical aperture is raised to about 0.85. It is widely Known that recording density of an optical recording medium such as an optical disk and a photo-electro-magnetic disk is increased in inverse proportion to an area of a spot formed on an information recording surface by an objective lens ($\propto(\lambda/NA)2$, wherein, $\lambda$ represents a wavelength of a light source, NA represents a numerical aperture of the objective lens). For making an optical recording medium to be of a high density type, there is a method to make a light source wavelength to be short, in addition to a method to make a numerical aperture of an objective lens to be high. However, that method has a problem that sufficient utility efficiency cannot be obtained in practical use, because a light transmission factor of a lens material falls sharply in the wavelength area where the wavelength is shorter than 400 nm. Therefore, in the novel optical pickup system, it is estimated that the numerical aperture of an objective lens is required to be further higher for the higher density.

However, the greater a numerical aperture is, the smaller a depth of focus is, because depth of focus d of the objective lens is inversely proportional to the second power of the numerical aperture, and thereby, the speed of response and accuracy required to an actuator for focusing of the objective lens become higher more and more. It is therefore preferable that the objective lens is light in weight as far as possible.

Further, when the depth of focus of the objective lens is small, a component of defocus that is caused when an instantaneous wavelength variation to which the focusing of the objective lens cannot follow is caused on the light source is great. Accordingly, when the numerical aperture is greater, the chromatic aberration of the objective lens needs to be corrected more strictly.

On the other hand, when a wavelength of the light source is shorter, the transmission factor for an incident light caused by scattered light on the lens surface is more problematic for the following reasons. When a lens surface is formed by a molding method employing a metal mold machined by a diamond cutting tool, a shape of an optical surface and a tool mark representing fine roughness caused on the machined surface when a metal mold is machined are transferred onto the surface of the lens. In this case, ratio $\gamma$ of scattered light to incident light on one lens surface is in the following relationship for wavelength $\lambda$ of incident light, refractive index n of lens material, and root mean square Hrms of surface roughness on the optical surface resulting from the tool mark.

$$\gamma=(2\pi/\lambda)^2 \cdot (n-1)^2 \cdot Hrms^2$$

Therefore, the transmission factor for the incident light becomes smaller because $\gamma$ is greater when the wavelength is shorter. For preventing a fall of the transmission factor caused by scattering of the incident light, Hrms needs to be kept small.

Further, when the numerical aperture of an objective lens is greater, an operating distance of an objective lens is shorter because an emerging angle of marginal light from the final surface of the objective lens is greater. In the design of the two-group-structured objective lens on which an operating distance tends to be shorter, compared with a single lens, it is important to secure a sufficient operating distance for preventing destruction of an optical recording medium. However, when a sufficient operating distance is secured, an angle (hereinafter, referred to as an apparent angle) formed by a tangential plane at the position where marginal light on the surface of the second lens group closest to the light source an by an optical axis becomes too great, resulting in a fear that a metal mold may not be machined accurately by a diamond tool.

Further, the objective lens representing a two-group-structured objective lens and having NA raised to about 0.9 is described in each of TOKKAIHEI Nos. 10-123410 and 10-82951. In these objective lenses, a ratio of an operating distance to an effective diameter of the objective lens on a light flux incident plane is small, and thereby, when trying to secure a sufficient operating distance, an effective diameter of the objective lens on the light flux incident plane becomes too great, resulting in a problem that a tendency to make an optical pickup apparatus to be large is brought about. In addition, when an operating distance is small, an effective diameter on the lens surface of the objective lens closest to an optical information recording medium is small, and thereby, energy density of light in the effective diameter on the aforesaid lens surface becomes high. Therefore, when a light flux having a short wavelength of about 400 nm is projected on the lens surface for a long time, there is a fear that an antireflection coating on the lens surface and lens materials in the vicinity of the lens surface are damaged.

SUMMARY OF THE INVENTION

An object of the invention is to provide an objective lens for recording and/or reproducing information on an optical information recording medium that is composed of a group of two positive lenses which are light in weight and can be manufactured by injection molding at low cost and on mass production basis, and has a numerical aperture raised to be greater than 0.85.

Further object is to provide an objective lens for recording and/or reproducing information on an optical information recording medium that is composed of a group of two positive lenses which are suitable to be used for an optical pickup apparatus wherein a wavelength of a light source is 500 nm or less, especially is of about 400 nm and has a numerical aperture raised to be greater than 0.85.

Further object is to provide an objective lens for recording and/or reproducing information on an optical information recording medium that is composed of a group of two positive lenses wherein chromatic aberration is corrected by a diffractive structure properly without increasing the number of lenses, and has a numerical aperture raised to be greater than 0.85.

Further object is to provide an objective lens for recording and/or reproducing information on an optical information recording medium that is composed of a group of two positive lenses which are less affected by scattering caused by tool marks and can be manufactured at low cost, and has a numerical aperture raised to be greater than 0.85.

Further object is to provide an objective lens for recording and/or reproducing information on an optical information recording medium that is composed of a group of two positive lenses for which a metal mold can be machined accurately by a diamond cutting tool even when a large operating distance is secured, and has a numerical aperture raised to be greater than 0.85.

Further object is to provide an objective lens for recording and/or reproducing information on an optical information recording medium that is composed of a group of two positive lenses wherein a sufficient operating distance is secured in spite of a small diameter, and has a numerical aperture raised to be greater than 0.85.

Further object is to provide an optical pickup apparatus that is equipped with the objective lens and a recording/reproducing apparatus.

For attaining the objects stated above, the first objective lens of the invention is represented by an objective lens for recording and/or reproducing an optical information recording medium which is composed of the first lens group having the positive refracting power and the second lens group having the positive refracting power both arranged in order from the light source side, and each of the first lens group and the second lens group is characterized to be formed with plastic materials and to satisfy the following expression (1);

$$NA > 0.85 \tag{1}$$

wherein, NA represents a prescribed numerical aperture on the image side that is needed for conducting recording or reproduction for an optical information recording medium.

In this objective lens, it is possible to make a size of a light-converged spot on the information recording surface to be small by making prescribed numerical aperture (NA) of the objective lens on the image side necessary for recording and/or reproducing an optical information recording medium to be greater than 0.85, and thereby, the recording density of the optical information recording medium can be further enhanced. Since the high NA objective lens of the invention is composed of two positive lens groups, refracting power for a ray of light is distributed to four surfaces, resulting in that an amount of aberration generated on each surface is small, various aberrations including spherical aberration can be corrected properly even on a light flux with high NA, deterioration of various aberrations caused by errors such as decentering of each surface is less, and the high NA objective lens can be made to be an objective lens which is easily manufactured. Further, since the first lens group and the second lens group are formed with plastic materials, even in the case of a two-group-structured high NA objective lens having a large volume, its weight and its inertia are small, and thereby, it is possible to lighten the load on an actuator for focusing, and to make the actuator to control the position of the objective lens more accurately. As a result, it is possible to attain reduction of focusing errors, miniaturization of an actuator and less power consumption of the actuator. Further, when the optical information recording medium is touched, damage of the optical information recording medium can be prevented. In addition, mass production at low cost can be realized through an injection molding method that employs a metal mold.

Incidentally, a preferable plastic material is one whose light transmission factor for thickness of 3 mm in the area of the wavelength to be used is 85% or higher and whose percentage of saturated water absorption is 0.5% or less. As a plastic material like this, polyolefin resin is preferable, and norbornane resin among polyolefin resins is more preferable.

The second objective lens of the invention is represented by an objective lens for recording and/or reproducing an optical information recording medium which is used for an optical pickup apparatus having a light source with a wavelength of 500 nm or less, and it is composed of the first lens group having the positive refracting power and the second lens group having the positive refracting power both arranged in order from the light source side, and it satisfies the following expression (2);

$$NA > 0.85 \tag{2}$$

wherein, NA represents a prescribed numerical aperture on the image side that is needed for conducting recording or reproduction for an optical information recording medium.

In this objective lens, it is possible to make a size of a light-converged spot on the information recording surface to be small by making the wavelength to be used (wavelength of the light source) to be 500 nm or less, and thereby, recording density of the optical information recording medium can be enhanced. When the wavelength to be used is 500 nm or less, or 450 nm or less in particular, light transmission factor of the lens material matters, and therefore, it is preferable to be formed from the lens material whose light transmission factor for the thickness of 3 mm in the area of wavelength of 380 nm or more is 85% or more. Due to this, output of a light source can be small, which makes a life of the light source to be extended, and an S/N ratio for reading signals for information reproduction can be improved.

Incidentally, as a light source having a wavelength of 500 nm or less, a semiconductor laser of a nitride of an element belonging to a group of III through V in the periodic table such as GaN and an SHG laser can be used.

The third objective lens of the invention is represented by an objective lens for recording and/or reproducing an optical information recording medium which is composed of the first lens group having the positive refracting power and the second lens group having the positive refracting power both arranged in the order from the light source side, and at least one surface is provided with a ring-shaped diffractive structure, and the following expression (3) is satisfied;

$$NA > 0.85 \tag{3}$$

wherein, NA represents a prescribed numerical aperture on the image side that is needed for conducting recording or reproduction for an optical information recording medium.

A laser beam emitted from a semiconductor laser representing a light source is generally considered to be a single wavelength (single mode) that is free from chromatic aberration. Actually, however, the laser beam sometimes has mode hopping wherein a central wavelength is made by changes in temperature and output to skip instantaneously by several nanometers. Depth of focus d of the objective lens is expressed by $d = \lambda/(NA)^2$ ($\lambda$ represents a wavelength of the light source and NA represents a numerical aperture of the objective lens) as is known commonly. Accordingly, the greater is NA, the smaller is the depth of focus, and chromatic aberration of the objective lens needs to be corrected, because defocusing resulting from chromatic aberration caused by mode hopping of a semiconductor laser becomes an unallowable problem in the objective lens whose NA is greater than 0.85. Further, the shorter is a wavelength, the greater is a change in refractive index caused by a change in wavelength, in general optical materials, and thereby, when using a semiconductor laser having a short wavelength, chromatic aberration is caused remarkably on the objective lens by mode hopping. Since the depth of focus of the objective lens becomes smaller when a wavelength of the light source is shorter, even a slight defocusing is not allowed, the necessity for correction of chromatic aberration of the objective lens becomes greater more and more, when a semiconductor laser with a short wavelength is used. As a method to correct chromatic aberration, there is available, for example, a method to make the first lens group to be a cemented doublet wherein a positive lens having a relatively large Abbe's number and a negative lens having a relatively small Abbe's number are cemented. In this case, however, it is unavoidable for a weight of the first lens group to be great, which is not preferable from the viewpoint of a load on an actuator for focusing. In that case, if a ring-shaped diffractive structure is provided on at least one surface as in the third objective lens, it is possible to correct chromatic aberration without increasing the number of lenses.

Further, it is preferable that the following expression (4) is satisfied in the third objective lens;

$$0.5 \leq (\nu d1 + \nu d2)/(2 \cdot f^2 \cdot NA^2) \cdot \Sigma(-2 \cdot ni \cdot b_{2i} \cdot hi^2) \leq 5.0 \quad (4)$$

wherein, $\nu d1$ represents Abbe's number of d line for the first lens group, $\nu d2$ represents Abbe's number of d line for the second lens group, f represents a focal length (mm) of the total system of the objective lens wherein a refracting lens and a diffractive structure are combined, $b_{2i}$ represents a coefficient of secondary optical path difference function obtained under the condition that a diffractive structure formed on $i^{th}$ surface is expressed by the optical path difference function defined by $\Phi b = ni \cdot (b_{2i} \cdot hi^2 + b_{4i} \cdot hi^4 + b_{6i} \cdot hi^6 + \ldots)$ (hereupon, ni represents the diffraction order of diffracted ray having the greatest amount of diffracted ray among diffracted rays generated by the diffractive structure formed on the $i^{th}$ surface, hi represents a height (mm) from an optical axis, and each of $b_{2i}$, $b_{4i}$ and $b_{6i}$ . . . represents a coefficient of optical path difference function for each of the second order, fourth order, sixth order, . . . (also called diffracting surface coefficient)), ni represents the diffraction order of diffracted ray having the greatest amount of diffracted ray among diffracted rays generated by the diffractive structure formed on the $i^{th}$ surface, and hi represents a height (mm) from the optical axis at the most peripheral position (position on the $i^{th}$ surface where the marginal light of NA stated above enters) of the effective diameter of the $i^{th}$ surface on which the diffractive structure is formed.

It is possible to correct properly chromatic aberration caused on the objective lens by mode hopping of the semiconductor laser having a wavelength of 500 nm or less, by determining the diffractive structure for the objective lens so that the expression (4) may be satisfied. In the case of the lower limit or more of the expression (4), insufficient correction is not caused on chromatic aberration of the wave surface in the case of forming a spot on the information recording surface of an optical information recording medium, while, in the case of the upper limit or less, excessive correction is not caused on chromatic aberration of the wave surface in the case of forming a spot on the information recording surface of an optical information recording medium.

Further, it is preferable that the following expression (5) is satisfied when a wavelength of the light source is represented by $\lambda$ (mm), a focal length of the total system of the objective lens is represented by f (mm), the diffraction order of diffracted ray having the greatest amount of diffracted ray among diffracted rays generated by the diffractive structure formed on the $i^{th}$ surface is represented by ni, the number of ring-shaped zones of the diffractive structure in the effective diameter on the $i^{th}$ surface is represented by Mi, and the minimum value of an interval of the ring-shaped zones of the diffractive structure in the effective diameter on the $i^{th}$ surface is represented by Pi (mm).

$$0.05 \leq f \cdot \lambda \cdot \Sigma(ni/(Mi \cdot Pi^2)) \leq 0.70 \quad (5)$$

It is possible to correct properly chromatic aberration caused on the objective lens by mode hopping of the semiconductor laser having a wavelength of 500 nm or less, by determining the diffractive structure for the objective lens so that the expression (5) may be satisfied. In the case of the lower limit or more of the expression (5), insufficient correction is not caused on chromatic aberration of the wave surface in the case of forming a spot on the information recording surface of an optical information recording medium, while, in the case of the upper limit or less, excessive correction is not caused on chromatic aberration of the wave surface in the case of forming a spot on the information recording surface of an optical information recording medium.

In the third objective lens, it is preferable that an amount of $ni^{th}$ order diffracted ray generated by the diffractive structure formed on the $i^{th}$ surface is greater than an amount of diffracted ray in any other diffraction order, and $ni^{th}$ order diffracted ray generated by the diffractive structure for recording and/or reproducing information for the optical information recording medium is converged on the information recording surface of the optical information recording medium. Hereupon, n is an integer other than 0 and ±1.

In the objective lens that conducts recording of information on an optical information recording medium and/or reproducing by utilizing diffracted ray in high order of the second or higher order, as stated above, if the diffractive structure is formed so that the diffraction efficiency of the diffracted ray having high order of the second or higher order may be the maximum, a height of the step between ring-shaped zones and an interval between ring-shaped zones become greater, which moderates the requested accuracy for the shape of the diffractive structure. When the diffracted ray of the second order or higher is used, a fall of the diffraction efficiency caused by a change in wavelength is generally greater, compared with an occasion for using the diffracted ray of the first order. However, when using a light source with a wavelength that is close to a single wavelength, an amount of a fall of the diffraction efficiency caused by a change in wavelength is negligibly small, which makes it possible to obtain an objective lens having the diffractive structure that is easily manufactured and has sufficient diffraction efficiency.

Further, it is preferable that the following expression (6) is satisfied in the third objective lens;

$$0.2 \leq |(Ph/Pf) - 2| \leq 6.0 \quad (6)$$

wherein, Pf represents a diffractive ring-shaped zone interval (mm) in a prescribed image side numerical aperture necessary for conducting recording and/or reproducing for an optical information recording medium, and Ph represents a diffractive ring-shaped zone interval (mm) in the numerical aperture that is a half that of the prescribed image side numerical aperture necessary for conducting recording and/or reproducing for an optical information recording medium.

Since it is possible to correct properly spherical aberration caused by wavelength variation when the expression (6) is satisfied by an interval of ring-shaped zones of the diffractive structure, namely by the interval of the ring-shaped zones in the direction perpendicular to the optical axis, positional adjustment in the direction of the optical axis for the coupling lens, or the objective lens or the light source in the case of incorporating the light source having the oscillation wavelength deviated from the standard wavelength is not needed, and substantial reduction of assembly time for the optical pickup can be attained. If the optical path difference function has nothing but the second order coefficient of optical path difference function (which is also called a diffraction surface coefficient), (Ph/Pf)−2=0 holds. However, in the objective lens of the invention, a change of spherical aberration caused by a minute change in wavelength from the standard wavelength is corrected properly by a diffractive action, and therefore, a high order coefficient of optical path difference function for the optical path difference function is used. In this case, it is preferable that (Ph/Pf)−2 takes a value that is away from zero to a certain extent, and if the expression (6) is satisfied, a change in spherical aberration caused by a wavelength change can be canceled properly by a diffractive action. In the case of the lower limit or more of the expression (6), excessive correction is not caused on spherical aberration caused by a change of wavelength from the standard wavelength, while, in the case of the upper limit or less, excessive correction is not caused on spherical aberration caused by a change in wavelength fro the standard wavelength.

When diffraction actions as a diffracting lens and refraction actions as a refracting lens are combined in the third objective lens, it is preferable to have longitudinal chromatic aberration characteristics wherein a back focus changes in the direction for it to be shortened and to satisfy the following expression (7);

$$-1 < \Delta CA/\Delta SA < 0 \qquad (7)$$

wherein, $\Delta CA$ represents an amount of change (mm) of longitudinal chromatic aberration for the change in wavelength, and $\Delta SA$ represents an amount of change (mm) of spherical aberration of marginal light for the change in wavelength.

In the objective lens wherein NA is greater than 0.85 and a wavelength to be used is 500 nm or less, an interval between adjoining diffractive ring-shaped zones tends to be small, because power of the diffractive structure that is needed for correction of chromatic aberration is great If the interval between the diffractive ring-shaped zones is small, an influence of manufacturing errors on the fall of diffraction efficiency is great, which is not preferable in practical use. Therefore, if there are provided longitudinal chromatic aberration characteristics wherein a back focus in the case of variation of the wavelength of the light source to the long wavelength side is made to be shorter compared with the back focus before the variation and the following expression (7) is satisfied, it is possible to realize an objective lens wherein an interval between diffractive ring-shaped zones can be kept to be large and a defocus component of wavefront aberration for mode hopping of the light source is small even for an objective lens wherein NA is greater than 0.85 and a wavelength to be used is 500 nm or less.

The expression (7) mentioned above means that the longitudinal chromatic aberration is corrected excessively by diffracting actions, and thereby, the spherical aberration curve of the standard wavelength and the spherical aberration curve on the long and short wavelength side (also called spherical aberration of color) are made to cross each other. Due to this, a movement of the best focus position in the case of variation of the wavelength of the light source can be kept to be small, thus, a defocus component of wavefront aberration in the case of mode hopping of the light source can be made small.

If chromatic aberration is corrected in the aforesaid manner, an interval between diffractive ring-shaped zones can be made to be larger than in the occasion where a defocus component of wavefront aberration in the case of mode hopping of the light source is made to be smaller by correcting longitudinal chromatic aberration and spherical aberration of color, thus, a fall of diffraction efficiency caused by manufacturing errors of the ring-shaped form can be prevented.

Further, when a glass lens is manufactured through a molding method employing a metal mold, a material of metal mold for molding a glass lens is required to have heat resistance because a melting point of glass is relatively high. Therefore, in general, a value of the surface roughness resulting from tool marks which are formed when a material of metal mold for molding a glass lens is machined by a diamond cutting tool tends to be larger, compared with an occasion where a material for a metal mold for molding a plastic lens is machined. Therefore, when an objective lens used for an optical pickup that uses a light source with a wavelength of about 400 nm is composed of a glass aspherical molded lens, transmission factor of light is lowered by an influence of scattering by tool marks, and there is a fear that a sufficient S/N ratio is not obtained on the light receiving surface of an photo detector. Further, since the types of optical glass materials for molding are limited, a degree of freedom for selection of materials in the course of lens design is low.

On the other hand, since the melting point of plastic is low, a material for a metal mold for molding a plastic lens is not required to have heat resistance that is for a metal mold for molding a glass lens. Therefore, it is possible to use a metal which can be machined easily as a material for the metal mold, and thereby, tool marks are hard to be formed on the metal mold for molding a plastic lens, thus, when an objective lens for a light source with a short wavelength is composed of a plastic aspherical molded lens, an influence of scattering caused by tool marks can be reduced. However, when an objective lens having high NA is represented by a plastic lens, a radius of curvature is small, resulting in a possibility of a lens that requires a metal mold which is hard to be machined. Therefore, what is preferable is a compound lens which is composed of a glass lens wherein at least one lens group has a refracting function and of an optical element made of plastic which is cemented on its one side with the glass lens and is provided on its other side with an optical surface, as in the fourth objective lens.

Namely, the fourth objective lens of the invention is an objective lens for recording and/or reproducing an optical information recording medium, and it is composed of the first lens group having positive refracting power and the second lens group having positive refracting power both arranged in the order from the light source side, and is a compound lens which is composed of a glass lens wherein at least one lens group has a refracting function and of an optical element made of plastic which is cemented on its one side with the glass lens and is provided on its other side with an optical surface, as in the fourth objective lens, and the following expression (8) is satisfied;

$$NA>0.85 \qquad (8)$$

Wherein, NA represents a prescribed image-side numerical aperture that is needed for conducting recording or reproducing for an optical information recording medium.

Further, it is preferable that a glass lens representing a foundation in the fourth objective lens is a spherical lens. By making the glass lens to be an inexpensive spherical ground lens, production cost for the lens can be controlled and an influence of scattering caused by tool marks can be eliminated. In addition, compared with a glass molded lens, the degree of freedom for selection of materials in the course of lens design can be made great.

Further, it is preferable that an optical surface formed on the plastic material is an aspheric surface in the fourth objective lens, and it is preferable that an optical surface formed on the plastic material is a diffractive surface having thereon a ring-shaped diffractive structure.

If an optical surface formed on an optical element made of plastic material is made to be an aspheric surface and/or a diffractive surface as stated above, an influence of scattering caused by tool marks can be reduced, because tool marks are hard to be formed on a metal mold for molding a plastic lens. Further, when forming a ring-shaped structure on a glass lens by a molding method employing a metal mold, a microscopic structure such as a ring-shaped structure is not transferred accurately because of a viscous property of glass, and thereby, a decline of diffraction efficiency and deterioration of image forming power tend to be caused. However, the microscopic structure can easily be transferred onto a plastic material.

It is preferable that a plastic material that is cemented with a glass lens in the fourth objective lens is ultraviolet-setting resin that is hardened when it is irradiated with ultraviolet radiations. A compound lens can be made through the method wherein ultraviolet-setting resin on the composition plane of the glass lens is irradiated with ultraviolet radiations while a mold of an aspheric surface and/or a diffraction surface is applied on the ultraviolet-setting resin so that resin may be hardened and a form of the aspheric surface and/or the diffraction surface may be transferred.

Further, it is preferable that the following expression (9) is satisfied when $D_{IN}$ (mm) represents an effective diameter on the light flux incident plane of the first lens group in the first objective lens, $$D_{IN} < 4.5 \text{ mm} \quad (9)$$

and the following expressions (10) and (11) are satisfied when WD (mm) represents a working distance of the objective lens.

$$0.020 < WD/D_{IN} < 0.150 \quad (10)$$

(provided that)

$$0.85 < NA < 0.90$$

$$0.015 < WD/D_{IN} < 0.120 \quad (11)$$

(provided that)

$$NA \geq 0.90$$

Further, it is preferable that the following expressions (12) and (13) are satisfied.

$$0.050 < WD/D_{IN} < 0.150 \quad (12)$$

(provided that)

$$0.85 < NA < 0.90$$

$$0.025 < WD/D_{IN} < 0.120 \quad (13)$$

(provided that)

$$NA \geq 0.90$$

Though it is effective to make a focal length of an objective lens to be large for securing a large working distance, it is not preferable in practical use because an optical pickup apparatus is made to be large in size. Therefore, the upper limit of the effective diameter on the light flux incident plane is made to be 4.5 mm as in the expression (9).

When trying to secure a large working distance in a two-group-structured objective lens having a small diameter, an apparent angle on the surface of the second lens group closest to the light source becomes too large, which makes it impossible to machine accurately a metal mold with a diamond cutting tool. Therefore, a range of the optimum working distance is established in each range of NA as shown in expressions (10) and (11). When the upper limit of each of the expressions (10) and (11) is not exceeded, an apparent angle on the surface of the second lens group closest to the light source does not become too large, which makes it possible to machine accurately a metal mold with a diamond cutting tool. It is further possible to realize a lens on which the sine conditions are corrected properly. Further, it is possible to reduce an influence of scattering caused by tool marks when the light flux passes through the final surface, because an effective diameter of the final surface of the lens can be made large. When the lower limit of each of the expressions (10) and (11) is not exceeded, the contact of the objective lens with an optical information recording medium caused by a warp of the optical information recording medium can be prevented, because a sufficient working distance can be secured in spite of a small diameter. The ranges of the expressions (12) and (13) are especially preferable for attaining the aforesaid function.

In the two-group-structured objective lens whose NA is greater than 0.85, when trying to secure a sufficient working distance for practical use, an apparent angle on each lens group closest to the light source tends to be large. When the apparent angle is too large, a metal mold cannot be machined accurately by a diamond cutting tool, which is a problem. If the two-group-structured objective lens whose NA is greater than 0.85 is formed with a plastic material, the aforesaid problem becomes more remarkable, because a refractive index of an ordinary optical plastic material is as relatively low as about 1.5. On the contrary, if the objective lens is formed with glass material whose refractive index is relatively high, it is possible to make an apparent angle not to be too large. However, it is not preferable, from the viewpoint of a burden on an actuator for focusing, that a two-group-structured objective lens having high NA which tends to be voluminous is made of glass material whose specific gravity is greater than that of a plastic material. Therefore, if one of two lens groups is made to be a light plastic lens and the other is made to be a glass lens whose refractive index is relatively high, it is possible to realize an objective lens wherein the total lens is not too heavy in spite of a two-group-structured objective lens whose NA is greater than 0.85, and an apparent angle is not too large.

Namely, the fifth objective lens of the invention is an objective lens for recording and/or reproducing an optical information recording medium, and it is composed of the first lens group having positive refracting power and the second lens group having positive refracting power both arranged in the order from the light source side, and one of the lens groups is a glass lens, while, the other is a plastic lens, and the following expression is satisfied;

$$NA>0.85 \tag{14}$$

wherein, NA represents a prescribed image-side numerical aperture that is necessary for conducting recording or reproducing for an optical information recording medium.

Further, it is preferable that the following expression is satisfied when $\rho G$ represents the specific gravity of the glass lens and $\rho P$ represents the specific gravity of the plastic lens in the fifth objective lens, $$\rho G > \rho P \tag{15}$$

the following expression is satisfied when the lens group having larger volume among the first lens group and the second lens group is the plastic lens, and nG represents the refractive index of the glass lens for d line, while, nP represents the refractive index of the plastic lens for d line, $$nG>nP \tag{16}$$

and the lens group having the larger angle formed by a tangential plane and an optical axis at the position where the marginal light on the plane closest to the light source passes among the first lens group and the second lens group is the glass lens.

If the lens group having the larger volume among two lens groups is made to be a plastic lens as stated above, the total objective lens can be made to be light in weight, and thereby, a burden on the actuator for focusing can be lightened. When each lens group has a flange section for assembling two lens groups accurately and/or for attaching an objective lens accurately to an optical pickup, it is preferable that the lens group having the larger volume including the flange section is made to be a plastic lens. Further, if the lens group on which an apparent angle on the surface closest to the light source is larger is made to be a glass lens, a metal mold can be machined accurately by a diamond cutting tool, because an apparent angle can be made not to be too large.

When the fifth objective lens is a two-group-structured objective lens whose NA is greater than 0.85, a lens group whose volume tends to be large is the first lens group, and a lens group on which an apparent angle on the surface closest to the light source tends to be large is the second lens group, and therefore, it is preferable that the first lens group is made to be a plastic lens and the second lens group is made to be a glass lens.

Further, it is preferable that the following expression (17) is satisfied in the fifth objective lens.

$$1.0<nG/nP<1.2 \tag{17}$$

When the first lens group is made to be a plastic lens, and the second lens group is made to be a glass lens, if a difference of refractive index between the plastic lens and the glass lens is too great, the extent of meniscus on the first lens group is high, and deterioration of wavefront aberration caused by optical axis shifting between the first lens group and the second lens group is severe, resulting in a lens which is difficult to be assembled. As a material for the glass lens, a material satisfying expression (17) is preferable, and when the upper limit of the expression (17) is not exceeded, the extent of meniscus on the first lens group is not too high, and thus, deterioration of wavefront aberration caused by optical axis shifting between the first lens group and the second lens group can be kept small. When the lower limit of the expression (17) is not exceeded, an apparent angle on the surface closest to the light source on the second lens group does not become too large even when a sufficient working distance is secured, which makes it possible to machine a metal mold accurately with a diamond cutting tool.

It is preferable that the following expression is satisfied when $D_{IN}$ (mm) represents an effective diameter on the light flux incident plane of the first lens group in the fifth lens, $$D_{IN}<4.5 \text{ mm} \tag{18}$$

and the following expressions (19) and (20) are satisfied when WD (mm) represents a working distance of the objective lens, $$0.020<WD/D_{IN}<0.150 \tag{19}$$

(provided that)

$$0.85<NA<0.90$$

$$0.015<WD/D_{IN}<0.120 \tag{20}$$

(provided that)

$$NA \geq 0.90$$

and the following expressions (21) and (22) are satisfied.

$$0.030<WD/D_{IN}<0.150 \tag{21}$$

(provided that)

$$0.85<NA<0.90$$

$$0.020<WD/D_{IN}<0.120 \tag{22}$$

(provided that)

$$NA \geq 0.90$$

Though it is effective to make a focal length of an objective lens to be large for securing a large working distance, it is not preferable in practical use because an optical pickup apparatus is made to be large in size. Therefore, the upper limit of the effective diameter on the light flux incident plane is made to be 4.5 mm as in the expression (18).

When trying to secure a large working distance in a two-group-structured objective lens having a small diameter, an apparent angle on the surface of the second lens group closest to the light source becomes too large, which makes it impossible to machine accurately a metal mold with a diamond cutting tool. Therefore, a range of the optimum working distance is established in each range of NA. When the upper limit of each of the expressions (19) and (20) is not exceeded, an apparent angle on the surface of the second lens group closest to the light source does not become too large, which makes it possible to machine accurately a metal mold with a diamond cutting tool. It is further possible to realize a lens on which the sine conditions are corrected properly. Further, it is possible to reduce an influence of scattering caused by tool marks when the light flux passes through the final surface, because an effective diameter of the final surface of the lens can be made large. When the lower limit of each of the expressions (19) and (20) is not exceeded, the contact of the objective lens with an optical information recording medium caused by a warp of the optical information recording medium can be prevented, because a sufficient working distance can be secured in spite of a small diameter. The ranges of the expressions (21) and (22) are especially preferable for attaining the aforesaid function.

In the objective lens composed of two positive lens groups, a working distance thereof tends to be small, compared with a conventional one-group-structured objective lens. Further, the possibility of the contact with an optical information recording medium that rotates at high speed becomes higher, because the greater is the numerical aperture of the objective lens, the smaller is the working distance. On the optical pickup apparatus employing a two-group-structured objective lens having high NA, security of sufficient working distance is an important matter related to damage of an optical information recording medium. In the two-group-structured objective lens having high NA, however, when trying to secure a large working distance, an apparent angle on the surface closest to the light source on the second lens becomes too great because power of the second lens group to the first lens group becomes small, and it becomes impossible to machine a metal mold accurately with a diamond cutting tool. Therefore, when at least a lens group on one side is made to be a lens with high refractive index made of a material whose refractive index for d line is 1.8 or more, as in the next sixth objective lens of the invention, an apparent angle on the surface closest to the light source on the second lens does not become too large even when a large working distance is secured, thus, it is possible to realize an objective lens wherein a large working distance can be secured and yet, the surface closest to the light source on the second lens group can be machined accurately in spite of the two-group-structured objective lens whose NA is greater than 0.85.

Namely, the sixth objective lens of the invention is an objective lens for recording and/or reproducing an optical information recording medium, and it is composed of the first lens group having positive refracting power and the second lens group having positive refracting power both arranged in the order from the light source side, and at least a lens group on one side is a lens with high refractive index that is made of a material whose refractive index for d line is 1.8 or more, and the following expression (23) is satisfied;

$$NA>0.85 \tag{23}$$

wherein, NA represents a prescribed image-side numerical aperture that is necessary for conducting recording or reproducing for an optical information recording medium.

As a material whose refractive index for d line is 1.8 or more as in the foregoing, telluride glass which includes 60–95 mol % of $TeO_2$ in the main constituent component of $TeO_2$ is preferable. To be concrete, $TeO_2$—$Nb_2O_5$ type telluride glass, $TeO_2$—$B_2O_3$—$Al_2O_3$ type telluride glass, $TeO_2$—$GeO_2$—$B_2O_3$ type telluride glass, $TeO_2$—$BaO$—$P_2O_5$ type telluride glass and $TeO_2$—$GeO_2$—$B_aO$—$P_2O_5$ type telluride glass are preferable.

Further, it is preferable that the above-mentioned lens with high refractive index is formed with a single crystal exemplified by either one of those including $SrNbO_3$, $SrTaO_3$, $CaNbO_3$, $CaTaO_3$, $CaTiO_3$, $KNbO_3$, $KTaO_3$, $BaZrO_3$, $SrZrO_3$, $CaZrO_3$, $K(Ta, Nb)O_3$, $ZnWO_4$, $ZnMo_4$, $CdWO_4$, $CdMo_4$, $PbWO_4$, $Bi_{20}SiO_{12}$, $Bi_{20}GeO_{12}$, $Bi_4Si_3O_{12}$, $Bi_4Ge_3O_{12}$, GaP, GaN, ZnTe, ZnSe, $Cu_3TaSe_4$, ZnS and $(Na_x, Ba_y)(Nb_x, Ti_y)O_3 (0.35 \leq x \leq 0.40, y=1-x)$ It is preferable that the following expression is satisfied when $D_{IN}$ (mm) represents an effective diameter on the light flux incident plane of the first lens group in the sixth lens, $$D_{IN}<4.5 \text{ mm} \tag{24}$$

and the following expressions (25) and (26) are satisfied when WD (mm) represents a working distance of the objective lens, $$0.020<WD/D_{IN}<0.180 \tag{25}$$

(provided that)

$$0.85<NA<0.90$$

$$0.040<WD/D_{IN}<0.150 \tag{26}$$

(provided that)

$$NA \geq 0.90$$

It is effective to make a focal length of the objective lens to be large for ensuring a large working distance, in which, however, an optical pickup apparatus is forced to be large in size, which is not preferable in practical use. Therefore, the upper limit of the effective diameter on the light flux incident plane of the objective lens was made to be 4.5 mm, as shown in the aforesaid expression (24). Further, when trying to ensure a large working distance in a two-group-structured objective lens with a small diameter, an apparent angle on the plane of the second lens group closest to the light source becomes too large, and a metal mold cannot be machined accurately with a diamond cutting tool. Therefore, a range of the optimum working distance was established in a range of NA, as shown in each of the expressions (25) and (26). When the upper limit of each of the expressions (25) and (26) is not exceeded, an apparent angle on the plane of the second lens group closest to the light source does not become too large, and a metal mold can be machined accurately with a diamond cutting tool. It is further possible to realize a lens whose sine condition is properly corrected. Further, it is possible to reduce an influence of scattering caused by tool marks generated when a light flux passes through the final surface, because an effective diameter of the final surface of the lens can be made large. When the lower limit of each of the expressions (25) and (26) is not exceeded, the contact of the objective lens with an optical information recording medium caused by a warp of the optical information recording medium can be prevented, because a sufficient working distance can be secured in spite of a small diameter.

It is further preferable that the following expression (27) is satisfied in the sixth objective lens.

$$-0.1 \leq (X2-X3)/f/(1+|m|) \leq 0.1 \tag{27}$$

Each term in the expression above is as follows. X2 is a distance from the plane that is tangential to the vertex of the surface of the first lens group that is perpendicular to an optical axis and is closest to an optical information recording medium to the plane of the first lens group closest to an optical information recording medium in the outermost peripheral portion of the effective diameter (position on the plane of the first lens group closest to an optical information recording medium where the marginal light of NA enters), and it is assumed that this distance measured in the direction toward an optical information recording medium from the reference of the tangential plane is positive, while that measured in the direction toward the light source is negative. X3 is a distance in the direction of an optical axis from the plane that is tangential to the vertex of the surface of the second lens group to the plane of the second lens group closest to the light source in the outermost peripheral portion of the effective diameter (position on the plane of the second lens group closest to the light source where the marginal light of NA enters), and it is assumed that this distance measured in the direction toward an optical information recording medium from the reference of the tangential plane is positive, while that measured in the direction toward the light source is negative. The symbol f represents a focal length (mm) of the total objective lens system, and m represents a lateral magnification of the objective lens defined by $NA_{OBJ}/NA_{IMG}$ when an object-side numerical aperture of the objective lens is represented by $NA_{OBJ}$ and an image-side numerical aperture of the objective lens is represented by $NA_{IMG}$.

The expression (27) representing a conditional expression shows conditions to realize a lens in which deterioration of wavefront aberration caused by manufacturing errors such as surface dencentering and shifting of optical axis between lens groups does not become too great even when a large working distance is ensured and image height characteristics are excellent. When the lower limit of the expression (27) is kept, deterioration of wavefront aberration caused by surface decentering does not become too great, and when the upper limit is kept, deterioration of wavefront aberration caused by shifting of optical axis between lens groups and image height does not become too great.

Further, the sixth objective lens has, on at least one surface thereof, a ring-shaped diffractive structure, and it is preferable that the following expression (28) is satisfied when a wavelength of the light source is represented by λ (mm), a focal length of the total system of the objective lens is represented by f (mm), the diffraction order of diffracted ray having the greatest amount of diffracted ray among diffracted rays generated by the diffractive structure formed on the $i^{th}$ surface is represented by ni, the number of ring-shaped zones of the diffractive structure in the effective diameter on the $i^{th}$ surface is represented by Mi, and the minimum value of an interval of the ring-shaped zones of the diffractive structure in the effective diameter on the $i^{th}$ surface is represented by Pi (mm).

$$0.05 \leq f \cdot \lambda \cdot \Sigma(ni/(Mi \cdot Pi^2)) \leq 3.0 \tag{28}$$

Since the higher is the refractive index of a material, the greater is the Abbe's number, there is generated longitudinal chromatic aberration greatly. However, it is possible to correct the longitudinal chromatic aberration properly by determining a diffractive structure so that the expression (28) may be satisfied, in the objective lens wherein longitudinal chromatic aberration is corrected by actions of a ring-shaped diffractive structure formed on at least one surface. When the lower limit of the expression (28) is kept, there is caused no insufficient correction of chromatic aberration on the wavefront for the spot formed on the information recording surface of an optical information recording medium, and when the upper limit is kept, there is caused no excessive correction of chromatic aberration on the wavefront for the spot formed on the information recording surface of an optical information recording medium.

It is preferable that the following expression (29) is satisfied in the first through sixth objective lenses.

$$0.85 < NA < 0.99 \tag{29}$$

Though it is preferable that NA in each of the through sixth objective lenses satisfies the expression (29) as stated above, it becomes difficult, as NA grows greater, to ensure the working distance that is sufficient in practical use while keeping manufacturing error sensitivity to be not more than the value that can be manufactured practically, and an incident angle of the marginal light that enters a protective layer of an optical information recording medium comes near to 90°, which causes a problem of a fall of an amount of light caused by reflection loss on the surface of the protective layer. In view of the this problem, the upper limit of NA for the first through sixth objective lenses was made to be 0.99.

Further, it is preferable that at least two surfaces among the surface of the first lens group closest to the light source, the surface of the first lens group closest to the optical information recording medium and the surface of the second lens group closest to the light source are represented by an aspheric surface in the first through sixth objective lenses.

If at least two surfaces among the surface of the first lens group closest to the light source, the surface of the first lens group closest to the optical information recording medium and the surface of the second lens group closest to the light source are made to be an aspheric surface, it is possible to properly correct coma-aberration and astigmatism in addition to spherical aberration. In this case, if at least two surfaces including the surface of the first lens group closest to the light source and the surface of the second lens group closest to the light source are represented by an aspheric surface, correction of aberration can be made more delicately, which is preferable. Furthermore, it is possible to keep the aberration caused by shifting of optical axis between the first lens group and the second lens group to be small by making also the surface of the first lens group to be an aspheric surface, which is preferable.

In the first through sixth objective lenses, it is preferable that the surface (lens final surface) of the second lens group closest to an optical information recording medium is aspheric surface. In the two-group-structured high NA lens having a small diameter, an effective diameter of the lens final surface tends to be small. Therefore, if the lens final surface which is made to be an aspheric surface or a diffractive surface is formed by a metal mold machined by a diamond cutting tool, an influence of scattering caused by tool marks becomes great, and transmittance factor of incident light is lowered. Therefore, if the lens final surface is made to be aspheric surface which can be formed by a ground metal mold or by grinding, it is possible to eliminate an influence of scattering caused by tool marks generated when a light flux passes through the final surface. Further, since the second lens group is greater in terms of power than the first lens group, deterioration of aberration caused by decentering of a lens surface of the second lens group tends to be greater. Accordingly, it is preferable that the lens final surface is a flat surface, which makes the second lens group to be a lens that can be made easily.

Further, it is preferable that the first through sixth objective lenses satisfy the following expression (30);

$$|m|=0 \tag{30}$$

wherein, m represents a lateral magnification of the objective lens defined by $NA_{OBJ}/NA_{IMG}$ when an object-side numerical aperture of the objective lens is represented by $NA_{OBJ}$ and an image-side numerical aperture of the objective lens is represented by $NA_{IMG}$.

When the objective lens is corrected in terms of aberration so that aberration may be minimum for a parallel light flux that comes from an object at infinity, a change in conditions for incidence to an objective lens is small, and thereby, aberration change is less, which is preferable. In addition, a beam forming element for easing astigmatic difference of a light flux emitted from a semiconductor laser light source can easily be arranged between a collimator lens for converting a divergent light flux coming from the light source into a parallel light.

Further, it is preferable that the first through sixth objective lenses satisfy the following expression (31)

$$0.01 < |m| < 0.30 \tag{31}$$

When the objective lens is corrected in terms of aberration so that the aberration may be minimum for a divergent light flux coming from an object positioned at the limited distance as stated above, collision between the objective lens and an optical information recording medium can be prevented because a large working distance can be secured. In this case, it is preferable that the lateral magnification of the objective lens satisfies the expression (31). When the upper limit is not exceeded, it is possible to keep the deterioration of aberration caused by errors of decentering of the first lens group such as surface decentering or group decentering, because an angle of incidence of a ray of light to the surface of the first lens group closest to the light source does not become too great. Further, an apparent angle for the surface of the second lens group closest to the light source does not become too great because the power of the second lens group does not become too great. In addition, optical elements such as a polarization beam splitter and a wavelength plate can easily be arranged because a distance between the objective lens and a light source does not become too small. When the lower limit of the expression (31) is not exceeded, it is possible to make an optical pickup apparatus equipped with the objective lens of the invention to be small, because a distance between an object and an image for the objective lens does not become too small.

Further, it is preferable that the first through sixth objective lenses satisfy the following expression (32);

$$0.6 \leq (f1/f2)/(1+|m|) \leq 6.0 \tag{32}$$

wherein, f1 represents a focal length (mm) of the first lens group, and f2 represents a focal length (mm) of the second lens group.

Though it is preferable that the first through sixth objective lenses satisfy the following expression (32) as stated above, when f1/f2 becomes too small in the objective lens of the invention, namely, when the power of the second lens group becomes too great, a radius of curvature of the surface of the second lens group closest to the light source becomes small, and deterioration of aberration caused by shifting of optical axis between the first lens group and the second lens group is increased. Further, the error sensitivity for the central lens thickness of the second lens becomes great. Further, an apparent angle for the surface of the second lens group closest to the light source becomes too great, which makes it impossible to machine accurately a metal mold with a diamond cutting tool. On the other hand, when f1/f2 becomes too great, namely, when the power of the first lens group becomes too great, it is impossible to correct properly the image height characteristics such as coma and astigmatism.

From the foregoing, for obtaining an objective lens that can be manufactured easily and has excellent performances, it is necessary that a value of (f1/f2)/(1+|m|) is within a certain range. When the upper limit of the expression (32) is not exceeded, a lens is made to be one that can easily be manufactured, and it is possible to obtain a compact optical pickup, because the lateral magnification does not become too small. When the lower limit of the expression (32) is not exceeded, it is possible to realize a lens having excellent image height characteristics, and optical elements such as a beam forming element, a polarization beam splitter and a wavelength plate can easily be arranged because a lateral magnification does not become too great.

Further, it is preferable that the first through sixth objective lenses satisfy the following expression (33);

$$-0.3 \leq (X1'-X3')/((NA)^4 f(1+|m|)) \leq 0.2 \tag{33}$$

$$X1' = X1 \cdot (N1-1)^3/f1$$

$$X3' = X3 \cdot (N2-1)^3/f2$$

wherein, X1 is a distance from the plane that is tangential to the vertex of the surface of the first lens group that is perpendicular to an optical axis and is closest to the light source to the plane of the first lens group closest to the light source in the outermost peripheral portion of the effective diameter (position on the plane of the first lens group closest to the light source where the marginal light of NA enters), and it is assumed that this distance measured in the direction toward an optical information recording medium from the reference of the tangential plane is positive, while that measured in the direction toward the light source is negative.

X3 is a distance from the plane that is tangential to the vertex of the surface of the second lens group that is perpendicular to an optical axis and is closest to the light source to the plane of the second lens group closest to the light source in the outermost peripheral portion of the effective diameter (position on the plane of the second lens group closest to the light source where the marginal light of NA enters), and it is assumed that this distance measured in the direction toward an optical information recording medium from the reference of the tangential plane is positive, while that measured in the direction toward the light source is negative.

N1 represents a refractive index of the first lens group for the wavelength to be used (provided that it is a refractive index of a glass lens representing a base body when the first lens group is a compound lens). N2 represents a refractive index of the first lens group for the wavelength to be used (provided that it is a refractive index of a glass lens representing a base body when the second lens group is a compound lens). The symbol f represents a focal length (mm) of the total objective lens system.

The expression (33) stated above corrects spherical aberration properly, and it is a conditional expression to prevent that an apparent angle on the surface of the second lens group closest to the light source becomes too great. In the first through sixth objective lenses, the smaller the value of f1/f2 is, or the greater the lateral magnification is, the larger the radius of curvature on the surface of the first lens group closest to the light source is, and the smaller the radius of curvature on the surface of the second lens group closest to the light source is. Therefore, sag amount (X1) of the surface of the first lens group closest to the light source that is necessary for correcting spherical aberration is small, and sag amount (X3) of the surface of the second lens group closest to the light source becomes great. Incidentally, when a value of X1 is positive and its absolute value is smaller, an effect for correcting spherical aberration of marginal light excessively is great, and when a value of X3 is positive and its absolute value is greater, an effect for correcting spherical aberration of marginal light insufficiently is great, and therefore, for correcting spherical aberration properly, a difference of sag amount (X1-X3) standardized by the refractive index of each lens for the wavelength to be used and by a focal length of each lens group needs to be within a certain range. On the other hand, in the first through sixth objective lenses, the greater is the lateral magnification, the smaller is X1 needed for correction of spherical aberration and the greater is X3 as stated above, and thereby, when X3 becomes too great, an apparent angle on the surface of the second lens group becomes great, and accurate machining of a metal mold is difficult.

Form the foregoing, it is preferable that the first through the sixth objective lenses satisfy the expression (33) mentioned above, and when the lower limit of the expression (33) is not exceeded, spherical aberration of the marginal light is not corrected excessively, while when the upper limit is not exceeded, spherical aberration of marginal light is not corrected insufficiently. Further, when the upper limit of the expression (33) is not exceeded, an apparent angle on the surface of the second lens group closest to the light source does not become too great, which makes it easy to machine a metal mold.

In the first through the sixth objective lenses, it is preferable to satisfy the following expressions (34) and (25);

$$0.4 \leq r1/((N1-1) \cdot f1) \leq 2.0 \tag{34}$$

$$0.7 \leq r3/((N2-1) \cdot f2) \leq 2.1 \tag{35}$$

wherein, r1 represents a paraxial radius of curvature (mm) of the surface of the first lens group closest to the light source (provided that it is a paraxial radius of curvature (mm) of the surface of a glass lens representing a base body when the first lens group is a compound lens wherein a plastic material is cemented on the surface of the first lens group closest to the light source), and r3 represents a paraxial radius of curvature (mm) of the surface of the second lens group closest to the light source (provided that it is a paraxial radius of curvature (mm) of the surface of a glass lens representing a base body when the first lens group is a compound lens wherein a plastic material is cemented on the surface of the first lens group closest to the light source).

The expressions (34) and (35) above represent the conditions for correcting coma properly. When the upper limit of each of the expressions (34) and (35) is not exceeded, the sine conditions do not become over, and when the lower limit is not exceeded, the sine conditions do not become under. When the upper limit of the expression (34) is not exceeded, load of power of the second lens group is not increased, and therefore, the error sensitivity for the lens thickness of the second lens group does not become too great, while when the lower limit is not exceeded, surface decentering sensitivity of the first lens group does not become too great.

It is preferable that the first through the sixth objective lenses are subjected to the correction of spherical aberration corresponding to thickness t of the protective layer that protects an information recording surface of an optical information recording medium, and they satisfy the following expression (36).

$$0.0 \text{ mm} \leq t \leq 0.15 \text{ mm} \tag{36}$$

The expression (36) is a conditional expression relating to the optimum thickness of the protective layer of an optical information recording medium for suppressing coma caused by skewing of an optical information recording medium. When the numerical aperture of the objective lens is made to be 0.9 or more, it is possible to secure a skew margin which is similar to or better than that for a conventional optical information recording medium such as CD and DVD, by making the thickness of the protective layer of the optical information recording medium to be smaller than 0.15 mm. If the thickness of the protective layer is zero, coma is not caused by disk skewing. Therefore, the objective lens of the invention can also be subjected to correction of spherical aberration corresponding to the thickness of the protective layer that is zero, namely, to correction of spherical aberration only for the objective lens.

Further, the optical pickup apparatus of the invention is provided with a light source and a light-converging optical system including an objective lens for converging light of a light flux emitted from the light source on an information recording surface of an optical information recording medium, and it is an optical pickup apparatus that conducts recording and/or reproducing information for the optical information recording medium by detecting light reflected from the information recording surface, and has either one of the first through sixth objective lenses as the aforesaid objective lens.

This optical pickup apparatus makes it possible to record and reproduce on a high density basis by the use of an objective lens having a large numerical aperture and is composed of two positive lenses and of a light source having a wavelength that is as short as about 400 nm, and it can ensure a sufficient working distance, and the device can be made small by making the objective lens to be small in size and light in weight.

Further, a recording and/or reproducing apparatus of the invention is equipped with the optical pickup apparatus, and it conducts recording of a sound and/or an image, and/or reproducing of a sound and/or an image. This recording and/or reproducing apparatus makes it possible to conduct recording and/or reproducing at high density.

DETAILED DESCRIPTION OF THE PREFERRED EMBODIMENT

Figure 1:
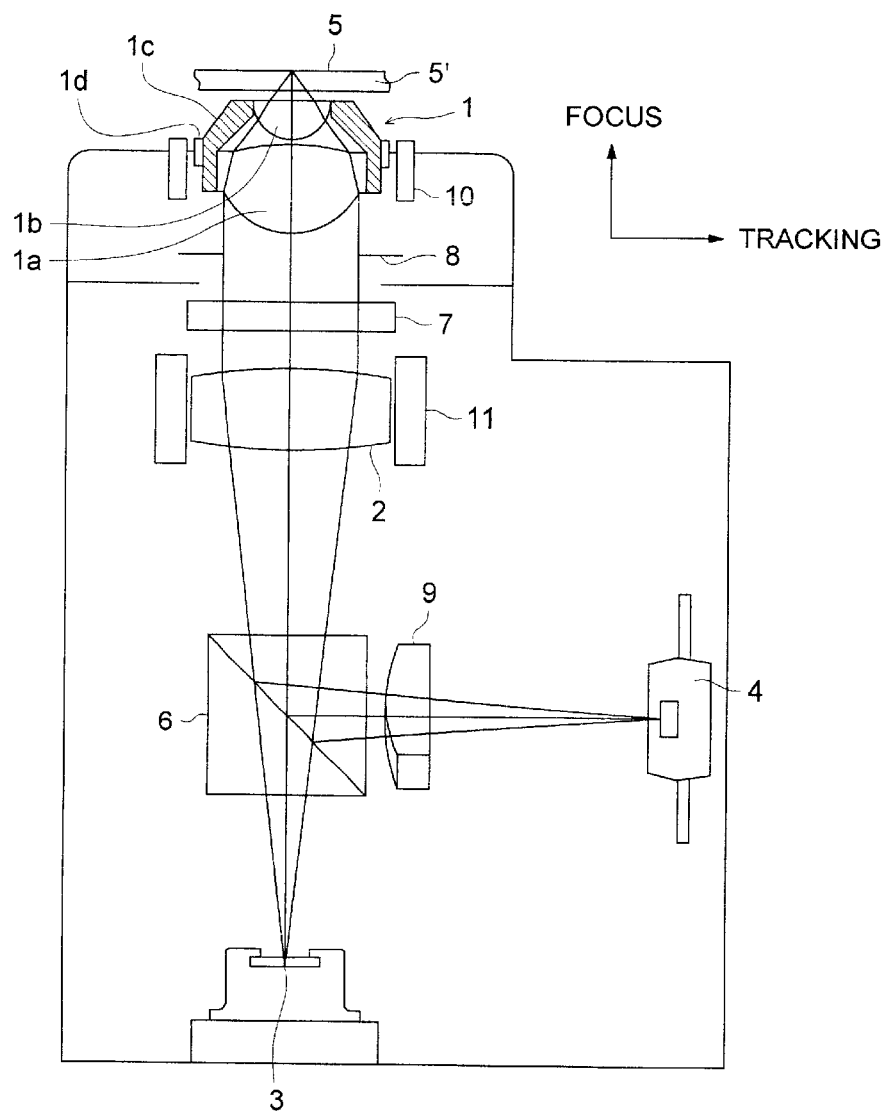
FIG. 1 is a diagram showing schematically an optical pickup apparatus in the present embodiment.

An optical pickup apparatus in the embodiment of the invention will be explained as follows, referring to drawings. FIG. 1 is a diagram showing schematically an optical pickup apparatus in the present embodiment.

The optical pickup apparatus in FIG. 1 is provided with objective lens 1 structured in 2 elements in 2 groups, semiconductor laser 3 representing a light source, coupling lens 2 structured in 1 element in 1 group that converts a divergence angle of divergent light emitted from the light source 3, and photo detector 4 that receives reflected light coming from information recording surface of an optical information recording medium. The semiconductor laser 3 emits a laser beam having a wavelength of 500 nm or less, and thereby, it is possible to conduct reproduction of information recorded on information recording surface 5 more densely than in a conventional optical information recording medium and/or recording of information on information recording surface 5 more densely than in a conventional disk.

In the objective lens 1 shown in FIG. 1, NA composed of the first lens 1a and the second lens 1b is made to be greater than 0.85. The first lens 1a and the second lens 1b are united integrally by holding member 1c. Flange section 1d of the holding member 1c makes it possible to attach the objective lens 1 accurately on the optical pickup apparatus.

The optical pickup apparatus in FIG. 1 is provided with polarization beam splitter 6 that separates reflected light coming from information recording surface 5 toward photo detector 4, ¼ wavelength plate 7 arranged between coupling lens 2 and objective lens 1, diaphragm 8 positioned to be ahead of the objective lens 1, cylindrical lens 9, and with biaxial actuator 2 that is for focusing and tracking. It is further provided with uniaxial actuator 11 for moving coupling lens 2 and coupling lens 2 in the direction of an optical axis, as a means for correcting spherical aberration. In the present embodiment, the light-converging optical system has therein a light source, a beam splitter, a coupling lens, a ¼ wavelength plate, an objective lens and a diaphragm. Incidentally, in the present embodiment, the beam splitter may be regarded as one that is not included in the light-converging optical system.

Reproduction of information from information recording surface 5 of an optical information recording medium will be explained. A divergent light emitted from semiconductor laser 3 is changed in terms of a divergence angle by coupling lens 2, then, passes through the ¼ wavelength plate 7 and the diaphragm 8, and is converged by the objective lens 1 on information recording surface 5 through protective layer 5' of an optical information/recording medium, and the light flux modulated by information bits and reflected on the information recording surface 5 passes through objective lens 1, diaphragm 8, ¼ wavelength plate 7, coupling lens 2, polarization beam splitter 6 and cylindrical lens 9 to enter photo detector 4, thus, information recorded on an information recording surface of an optical information recording medium by output signals generated by the foregoing can be reproduced.

When variation of spherical aberration is caused on each optical surface of a light-converging optical system for the reason of a change of ambient temperature for the apparatus, a change in the protective layer of an optical information recording medium or a fine variation of oscillated wavelength of semiconductor laser 3, in the case of reproducing information as in the foregoing, it is possible to correct spherical aberration caused on each optical surface of the light-converging optical system, by moving coupling lens 2 in the direction of an optical axis for an appropriate distance with uniaxial actuator 11 and thereby by changing a divergence angle of the light flux entering objective lens 1.

Figure 2:
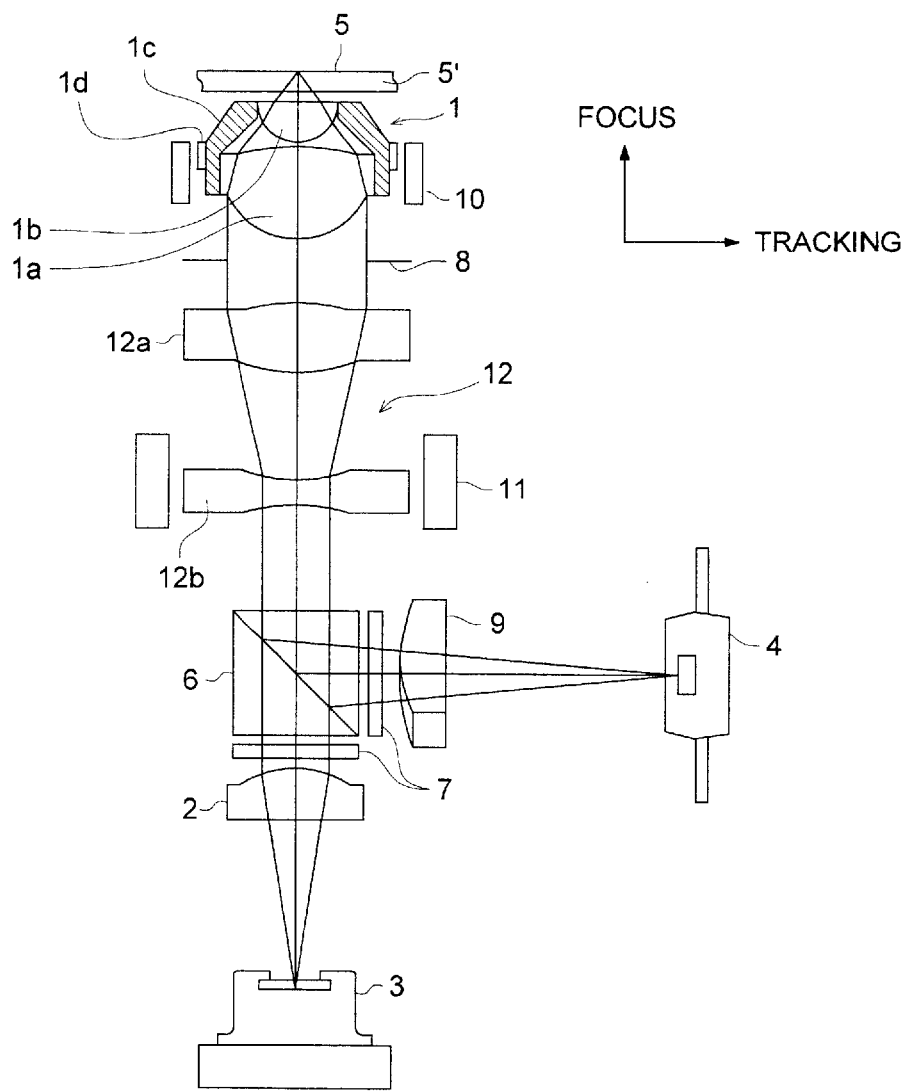
FIG. 2 is a diagram showing schematically another optical pickup apparatus in the present embodiment.

Next, another pickup apparatus will be explained as follows, referring to FIG. 2. Objective lens 1 shown in FIG. 2 is structured in 2 elements in 2 groups, and its NA is made to be greater than 0.85. The optical pickup apparatus shown in FIG. 2 is provided with beam expander 12 composed of positive lens 12a and negative lens 12b and with uniaxial actuator 11 which can move the negative lens 12b in the direction of an optical axis. In FIG. 2, coupling lens 2 and ¼ wavelength plate 7 are arranged between semiconductor laser 3 and polarization beam splitter 6.

In the optical pickup apparatus shown in FIG. 2, when variation of spherical aberration is caused on each optical surface of a light-converging optical system for the reason of a change of ambient temperature for the apparatus, a change in the protective layer of an optical information recording medium or a fine variation of oscillated wavelength of semiconductor laser 3, it is possible to correct spherical aberration caused on each optical surface of the light-converging optical system, by moving the negative lens 12b of the beam expander 12 in the direction of an optical axis for an appropriate distance with uniaxial actuator 11 and thereby by changing a divergence angle of the light flux entering objective lens 1 in the same way as in FIG. 1.

The optical pickup apparatus shown in each of FIG. 1 and FIG. 2 has therein a spherical aberration detecting means that is not illustrated but detects variations of spherical aberration caused on the light-converging optical system by detecting reflected light coming from information recording surface 5, and generates signals of spherical aberration errors based on results of the aforesaid detection. Coupling lens 2 or beam expander 12 which is serving as a spherical aberration correcting means is driven so that signals of spherical aberration errors may be zero. As a spherical aberration detecting means of this sort and as a spherical aberration detecting method in the spherical aberration detecting means, it is possible to use one described in TOKUGAN No.2001-108378 by the same applicant, for example. Incidentally, the spherical aberration detecting means mentioned above is arranged between the spherical aberration correcting means and the light source.

Further, in the optical pickup apparatus shown in each of FIG. 1 and FIG. 2, it is possible to use, as a spherical aberration correcting means, an element in which the distribution of refractive index in the direction perpendicular to the optical axis is changed electrically, instead of the aforesaid coupling lens 2 and beam expander 12. In this case, it is possible to make the optical pickup apparatus to be light in weight and to attain cost reduction, because moving portions are not needed. As a refractive-index-distribution-variable element of this kind, it is possible to use, for example, a liquid crystal element wherein a first liquid crystal element in which liquid crystal molecules are arranged in optional X direction on the plane that is perpendicular to the optical axis and a second liquid crystal element in which liquid crystal molecules are arranged in optional Y direction that is perpendicular to the X direction on the plane perpendicular to the optical axis are laminated alternately with a ½ wavelength plate and a glass base board interposed between the crystal elements.

In the optical pickup apparatus shown in each of FIG. 1 and FIG. 2, it is possible to realize recording and reproducing on a high density basis by using a two-group-two-element objective lens having a greater numerical aperture and a light source having a wavelength that is as short as about 500 nm, and it is further possible to ensure a sufficient working distance and to realize a small-sized apparatus by making an objective lens to be small in size and light in weight.

EXAMPLE

Next, there will be explained Examples 1–11 of an objective lens that is applicable to the optical pickup apparatus in each of FIG. 1 and FIG. 2. A table of data of each example is shown in Table 1.

TABLE 1

Table for Example

| | Example 1 | Example 2 | Example 3 | Example 4 | Example 5 | Example 6 |
|---|---|---|---|---|---|---|
| f (mm) | 1.67 | 1.58 | 1.67 | 1.58 | 1.58 | 1.67 |
| NA | 0.90 | 0.95 | 0.90 | 0.95 | 0.95 | 0.90 |
| $\lambda$(nm) | 405 | 405 | 405 | 405 | 405 | 405 |
| $|m|$ | 0 | 0 | 0.08 | 0 | 0.04 | 0 |
| t (mm) | 0.05 | 0.01 | 0.05 | 0.05 | 0.05 | 0.05 |
| WD (mm) | 0.17 | 0.10 | 0.23 | 0.10 | 0.12 | 0.15 |
| $D_{IN}$ (mm) | 3.00 | 3.00 | 3.09 | 3.00 | 3.37 | 3.00 |
| $WD/D_{IN}$ | 0.057 | 0.033 | 0.074 | 0.033 | 0.036 | 0.050 |
| $(vd1 + vd2)/(2 \cdot f^2 NA^2) \cdot \Sigma(-2 \cdot ni \cdot b_{2i} \cdot hi^2)$ | | | | | 2.0 | 2.8 |
| $f \cdot \lambda \cdot \Sigma(ni/(Mi \cdot Pi^2))$ | | | | | 0.50 | 0.15 |
| $|(Ph/Pf) - 2|$ | | | | | 2.6 | 0.0 |
| $\Delta CA/\Delta SA$ (provided that $\Delta\lambda = +10$ nm) | | | | | | −0.3 |
| $(x2 - x3)/f/(1 + |m|)$ | −0.25 | −0.28 | −0.35 | −0.25 | 0.26 | 0.12 |
| $(f1/f2)/(1 + |m|)$ | 2.6 | 2.2 | 1.9 | 2.0 | 1.8 | 4.0 |
| $(X1' - X3')/((NA)^4 \cdot f \cdot (1 + |m|))$ | −0.02 | −0.01 | −0.02 | −0.01 | −0.01 | −0.09 |
| $r1/((N1 - 1) \cdot f1)$ | 0.8 | 0.9 | 1.0 | 1.0 | 1.1 | 0.8 |
| $r3/((N2 - 1) \cdot f2)$ | 1.0 | 1.0 | 1.0 | 1.0 | 1.0 | 1.0 |

| | Example 7 | Example 8 | Example 9 | Example 10 | Example 11 |
|---|---|---|---|---|---|
| f (mm) | 1.58 | 1.58 | 1.67 | 1.70 | 1.39 |
| NA | 0.95 | 0.95 | 0.90 | 0.88 | 0.92 |
| $\lambda$(nm) | 405 | 405 | 405 | 405 | 405 |
| $|m|$ | 0 | 0.07 | 0 | 0 | 0 |
| t (mm) | 0.05 | 0.01 | 0.03 | 0.08 | 0.02 |
| WD (mm) | 0.10 | 0.15 | 0.25 | 0.20 | 0.06 |
| $D_{IN}$ (mm) | 3.00 | 3.08 | 3.00 | 3.00 | 2.50 |
| $WD/D_{IN}$ | 0.033 | 0.049 | 0.083 | 0.067 | 0.022 |
| $(vd1 + vd2)/(2 \cdot f^2 NA^2) \cdot \Sigma(-2 \cdot ni \cdot b_{2i} \cdot hi^2)$ | 1.9 | | 2.0 | | 3.4 |
| $f \cdot \lambda \cdot \Sigma(ni/(Mi \cdot Pi^2))$ | 0.47 | | 1.35 | | 0.32 |
| $|(Ph/Pf) - 2|$ | 0.8 | | 4.6 | | 0.4 |
| $\Delta CA/\Delta SA$ (provided that $\Delta\lambda = +10$ nm) | | | | | |
| $(x2 - x3)/f/(1 + |m|)$ | −0.20 | −0.30 | 0.01 | −0.27 | −0.30 |
| $(f1/f2)/(1 + |m|)$ | 4.5 | 2.2 | 2.7 | 2.6 | 1.8 |
| $(X1' - X3')/((NA)^4 \cdot f \cdot (1 + |m|))$ | −0.10 | −0.04 | −0.20 | −0.03 | −0.02 |
| $r1/((N1 - 1) \cdot f1)$ | 0.8 | 0.9 | 0.7 | 0.8 | 1.0 |
| $r3/((N2 - 1) \cdot f2)$ | 1.2 | 1.0 | 1.0 | 1.0 | 1.0 |

An aspheric surface in the lens of the present example is expressed by the following Numeral 1 when X axis represents a direction of an optical axis, h represents a height in the direction that is perpendicular to the optical axis and r represents a radius of curvature on a refractive interface, wherein κ represents a constant of the cone and A2i represents an aspheric surface coefficient.

$$X = \frac{\frac{h^2}{r}}{1 + \sqrt{1 - (1+\kappa)h^2/r^2}} + \sum_{i=2}^{10} A_{2i} h^{2i} \quad \text{Numeral 1}$$

A ring-shaped diffractive surface provided on the lens of the present example can be expressed by the following Numeral 2 with optical path difference function Φb. In this case, n represents a diffraction order of the diffracted ray having the maximum amount of light among diffracted rays generated by the diffractive surface, h represents a height in the direction perpendicular to the optical axis and $b_{2j}$ is a coefficient of the optical path difference function.

$$\Phi_b = n \sum_{j=1}^{5} b_{2j} h^{2j} \quad \text{Numeral 2}$$

In the following explanations for Examples 1 to 11, f is a focal length of the objective lens, NA is an optical information recording medium side numerical aperture, t is a thickness of a protective layer of the optical information recording medium, λ is a design standard wavelength, and m is a magnification.

Example 1

Figure 3:
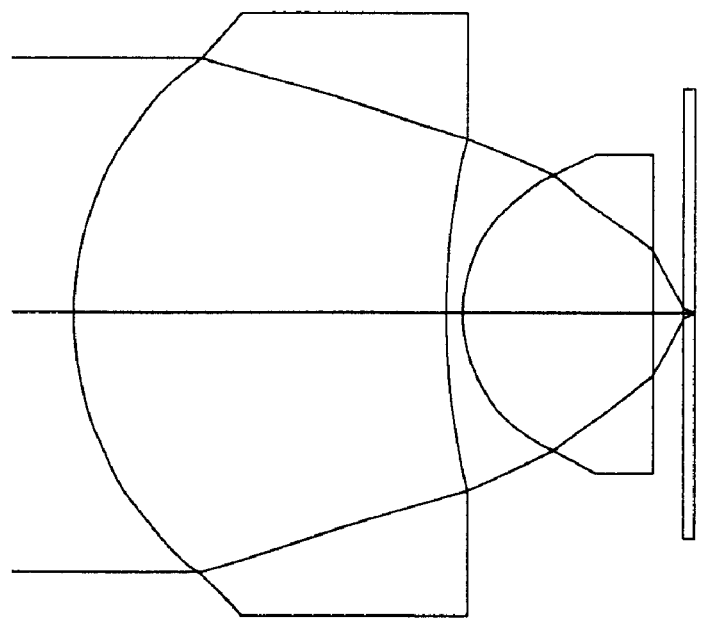
FIG. 3 is a diagram of an optical path relating to Example 1.
Figure 4:
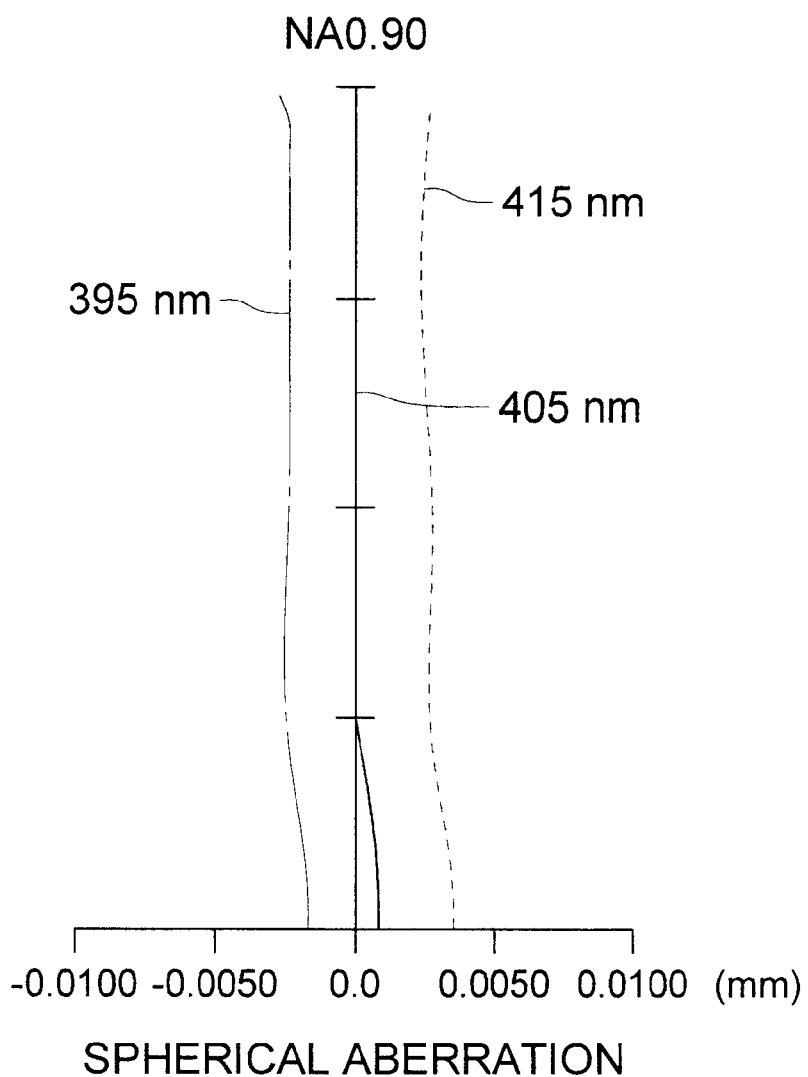
FIG. 4 is a diagram of spherical aberration relating to Example 1.

Example 1 represents a two-group-structured objective lens with f=1.67 mm, NA 0.90, t=0.05 mm, λ=405 nm and |m|=0. Lens data of Example 1 are shown in Table 2. FIG. 3 shows an optical path diagram relating to Example 1, and FIG. 4 shows a spherical aberration diagram relating to Example 1.

TABLE 2

Example 1

| Surface No. | r (mm) | d (mm) | Nλ | vd | Remarks |
|---|---|---|---|---|---|
| 0 | ∞ | | | | Light source |
| 1 | 1.755 | 2.150 | 1.52469 | 56.5 | Objective lens |
| 2 | 5.627 | 0.100 | | | |
| 3 | 0.819 | 1.100 | 1.52469 | 56.5 | |
| 4 | ∞ | 0.170 | | | |
| 5 | ∞ | 0.050 | 1.61949 | 30.0 | Protective layer |
| 6 | ∞ | | | | |

Aspheric surface coefficient

| | First surface | Second surface | Third surface |
|---|---|---|---|
| κ | −1.7463E−01 | 0.0000E+00 | −1.0379E+00 |
| A4 | −5.0345E−03 | 3.1674E−02 | 2.4662E−01 |
| A6 | 2.0602E−03 | −6.9427E−04 | −1.2226E−01 |
| A8 | −2.0117E−03 | −1.3117E−03 | 7.1215E−01 |
| A10 | −2.9425E−04 | −2.0399E−02 | −4.9112E−01 |
| A12 | 5.7128E−05 | 7.4246E−03 | 1.7296E−11 |
| A14 | 2.0154E−04 | 1.0319E−03 | |
| A16 | −1.0445E−04 | 1.8876E−09 | |
| A18 | 8.8905E−06 | | |
| A20 | 1.1041E−07 | | |

In Example 1, it was possible to realize an objective lens that is as light as about 0.02 g (excluding a lens frame) in spite of a two-group-structured high NA lens having a large volume, because the first lens and the second lens were formed with plastic materials. The plastic material is norbornane type resin of a polyolefin type, wherein the internal transmittance for thickness 3 mm in a wavelength area to be used is 95% or more, the coefficient of saturated moisture absorption is 0.01% or less and the specific gravity is about 1.0.

In spite of a high NA lens with NA 0.90, the working distance of 0.17 mm is secured, and both image height characteristics and sensitivity for errors caused by optical axis shifting between lenses are excellent in the lens in Example 1. When a high NA lens is formed with a plastic material which is easily affected by temperature changes, spherical aberration caused by the temperature changes tends to be a problem. In the plastic lens of the invention, however, it was possible to make an amount of generation of third order spherical aberration to be balanced with that of higher order spherical aberration having the sign opposite to that of the third order spherical aberration, by making a ratio of the working distance to an effective diameter of the first surface of the first lens to be an appropriated value, and thus, it was possible to realize an objective lens in which the wavefront aberration can be kept to 0.028 λrms (calculated value) and a range of usable temperatures is broad in spite of a high NA plastic lens, even in the case of temperature rise from a room temperature (25° C.) to 30° C. in Example 1. In the calculation above, however, a change in refractive index for temperature changes of plastic materials was made to be $-12 \times 10^{-5}$/° C., and a wavelength change for temperature changes of the light source was made to be +0.05 nm/° C.

Example 2

Figure 5:
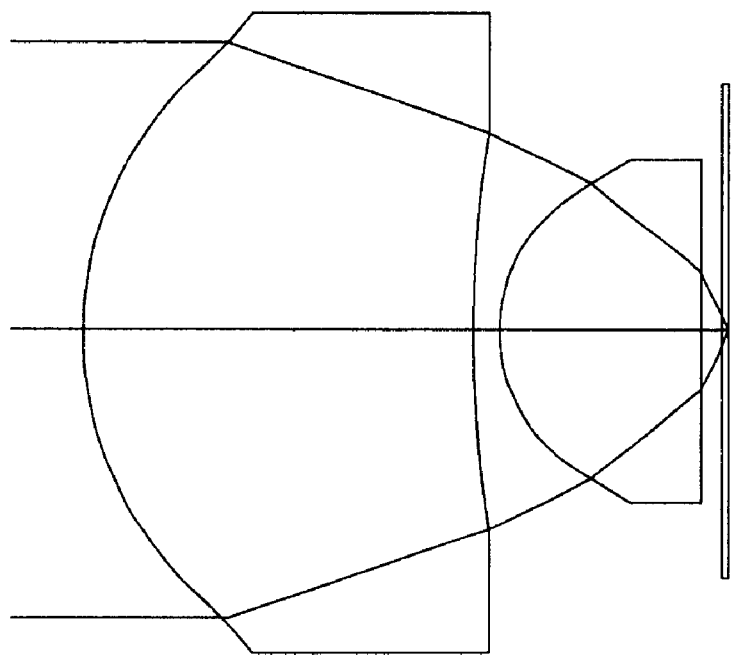
FIG. 5 is a diagram of an optical path relating to Example 2.
Figure 6:
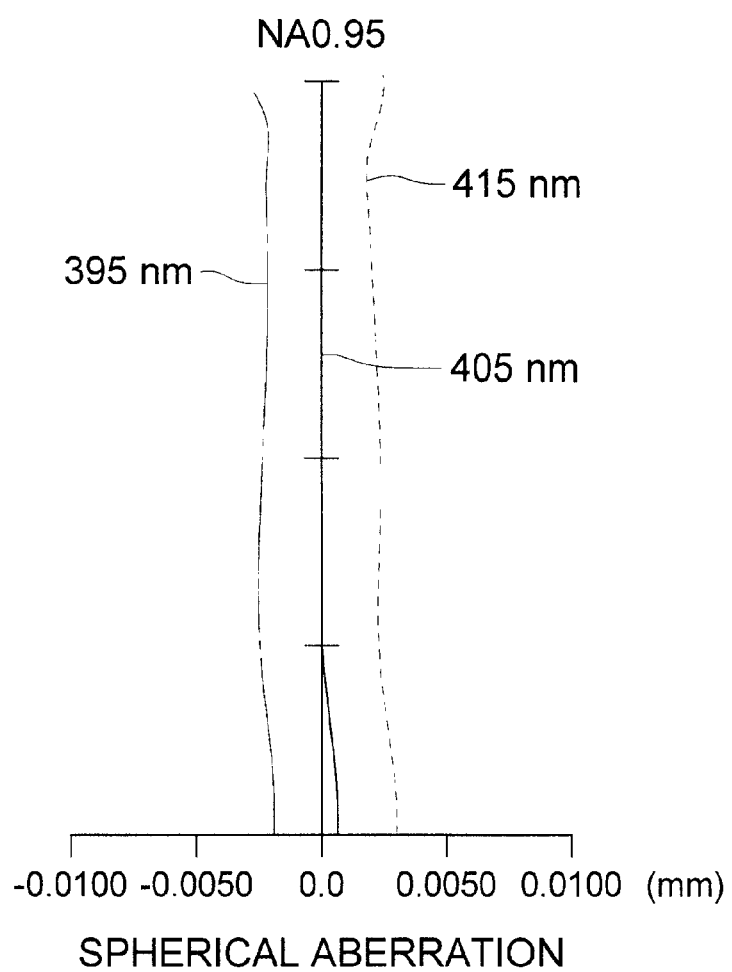
FIG. 6 is a diagram of spherical aberration relating to Example 2.

Example 2 represents a two-group-structured objective lens with f=1.58 mm, NA 0.95, t=0.01 mm, λ=405 nm and |m|=0. Lens data of Example 2 are shown in Table 3. FIG. 5 shows an optical path diagram relating to Example 2, and FIG. 6 shows a spherical aberration diagram relating to Example 2.

TABLE 3

Example 2

| Surface No. | r (mm) | d (mm) | Nλ | vd | Remarks |
|---|---|---|---|---|---|
| 0 | ∞ | | | | Light source |
| 1 | 1.621 | 2.100 | 1.52469 | 56.5 | Objective lens |
| 2 | 10.591 | 0.100 | | | |
| 3 | 0.816 | 1.100 | 1.52469 | 56.5 | |
| 4 | ∞ | 0.100 | | | |
| 5 | ∞ | 0.010 | 1.61949 | 30.0 | Protective layer |
| 6 | ∞ | | | | |

Aspheric surface coefficient

| | First surface | Second surface | Third surface |
|---|---|---|---|
| κ | −2.5087E−01 | 3.5960E+01 | −7.2963E−01 |
| A4 | −8.8146E−03 | 1.8943E−02 | 2.2352E−01 |
| A6 | 4.9481E−03 | 9.5029E−03 | −2.9816E−01 |
| A8 | −4.5981E−03 | −3.1001E−03 | 1.3546E+00 |
| A10 | 7.0890E−04 | −3.0071E−02 | −1.1062E+00 |
| A12 | 1.2864E−04 | 1.3638E−02 | |
| A14 | −2.3342E−05 | | |
| A16 | −7.8928E−05 | | |
| A18 | 4.5268E−05 | | |
| A20 | −1.2583E−05 | | |

In Example 2, it was possible to realize an objective lens that is as light as about 0.02 g (excluding a lens frame) in spite of a two-group-structured high NA lens having a large volume, because the first lens and the second lens were formed with plastic materials. Since the plastic material is the same as that in Example 1, explanation thereof will be omitted here.

Example 3

Figure 7:
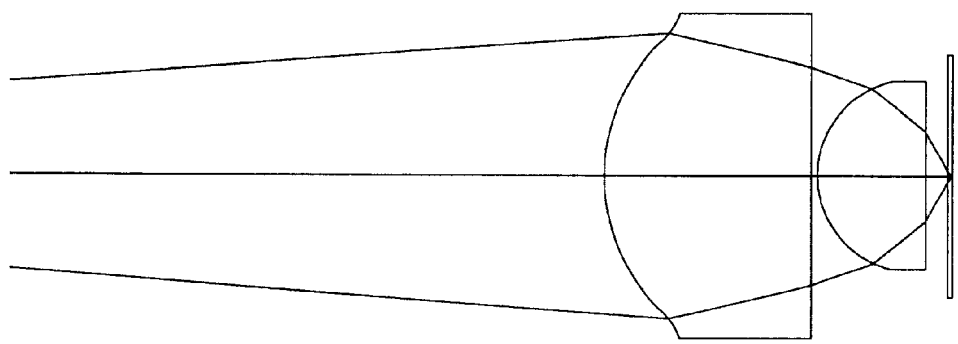
FIG. 7 is a diagram of an optical path relating to Example 3.
Figure 8:
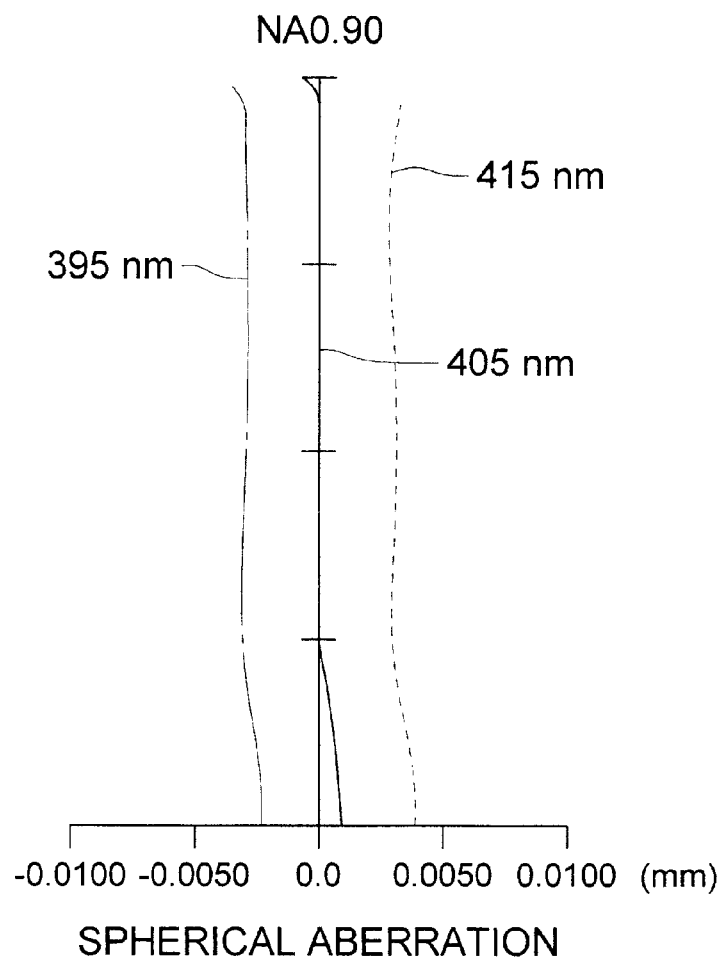
FIG. 8 is a diagram of spherical aberration relating to Example 3.

Example 3 represents a two-group-structured objective lens with f=1.67 mm, NA 0.90, t=0.05 mm, $\lambda$=405 nm and $|m|$=0.08. Lens data of Example 3 are shown in Table 4. FIG. 7 shows an optical path diagram relating to Example 3, and FIG. 8 shows a spherical aberration diagram relating to Example 3.

TABLE 4

Example 3

| Surface No. | r (mm) | d (mm) | N$\lambda$ | vd | Remarks |
|---|---|---|---|---|---|
| 0 |  | 20.586 |  |  | Light source |
| 1 | 1.808 | 2.230 | 1.52469 | 56.5 | Objective lens |
| 2 | 31.596 | 0.100 |  |  |  |
| 3 | 0.899 | 1.200 | 1.52469 | 56.5 |  |
| 4 | ∞ | 0.230 |  |  |  |
| 5 | ∞ | 0.050 | 1.61949 | 30.0 | Protective layer |
| 6 | ∞ |  |  |  |  |

Aspheric surface coefficient

|  | First surface | Second surface | Third surface |
|---|---|---|---|
| κ | −2.5248E−01 | 0.0000E+00 | −1.2216E+00 |
| A4 | −1.2639E−02 | 2.5943E−03 | 2.2069E−01 |
| A6 | 3.6379E−03 | 1.1603E−02 | −6.9836E−02 |
| A8 | −2.0286E−03 | 7.5608E−03 | 2.8821E−01 |
| A10 | −1.5845E−04 | −1.7539E−02 | −1.4953E−01 |
| A12 | 3.9756E−05 | 5.0953E−03 |  |
| A14 | 1.7750E−04 |  |  |
| A16 | −1.0393E−04 |  |  |
| A18 | 1.6364E−05 |  |  |
| A20 | −1.2742E−06 |  |  |

In Example 3, it was possible to realize an objective lens that is as light as about 0.02 g (excluding a lens frame) in spite of a two-group-structured high NA lens having a large volume, because the first lens and the second lens were formed with plastic materials. Since the plastic material is the same as that in Example 1, explanation thereof will be omitted here.

In spite of a high NA lens with NA 0.90, the working distance of 0.23 mm is secured, and both image height characteristics and sensitivity for errors caused by optical axis shifting between lenses are excellent in the lens in Example 3. By making a ratio of the working distance to an effective diameter on the incident plane of the first lens for a light flux to be an appropriated value, in the same way as in the objective lens in Example 1, it was possible to realize an objective lens in which the wavefront aberration can be kept to 0.026 $\lambda$rms (calculated value) and a range of usable temperatures is broad in spite of a high NA plastic lens, even in the case of temperature rise from a room temperature (25° C.) to 30° C.

Example 4

Figure 9:
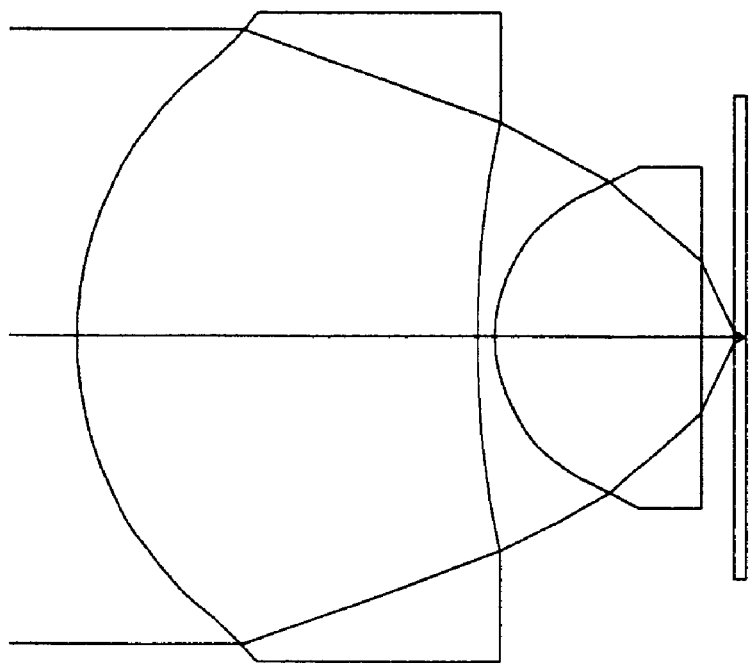
FIG. 9 is a diagram of an optical path relating to Example 4.
Figure 10:
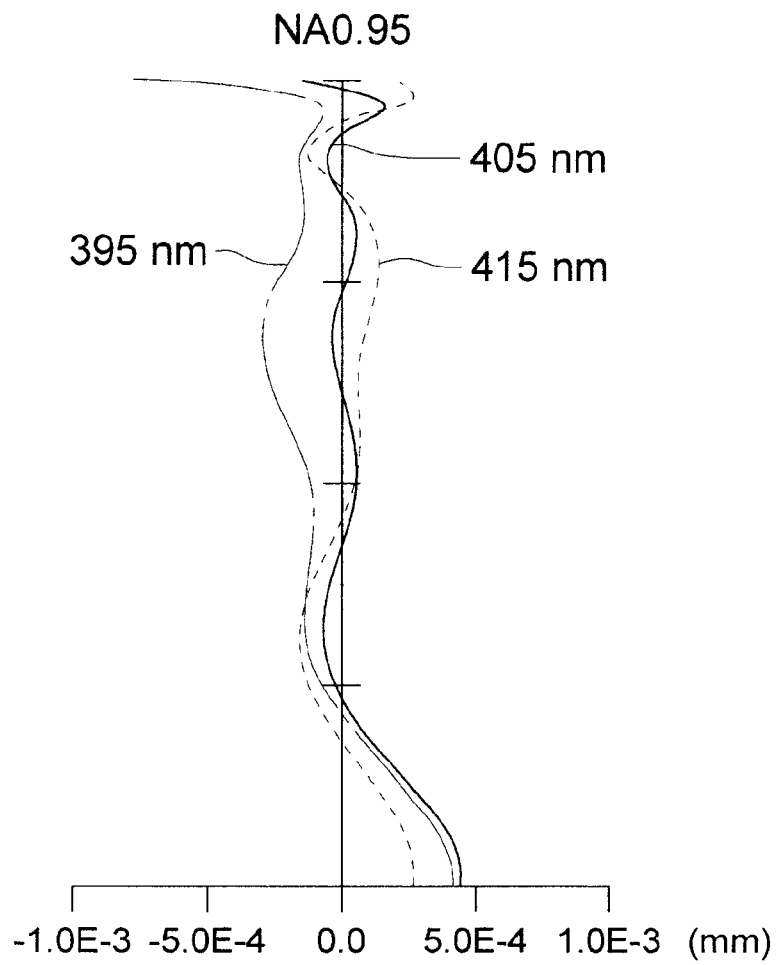
FIG. 10 is a diagram of spherical aberration relating to Example 4.

Example 4 represents a two-group-structured objective lens with f=1.58 mm, NA 0.95, t=0.05 mm, $\lambda$=405 nm and $|m|$=0. Lens data of Example 4 are shown in Table 5. FIG. 9 shows an optical path diagram relating to Example 4, and FIG. 10 shows a spherical aberration diagram relating to Example 4.

TABLE 5

Example 4

| Surface No. | r (mm) | d (mm) | N$\lambda$ | vd | Remarks |
|---|---|---|---|---|---|
| 0 |  | ∞ |  |  | Light source |
| 1 | 1.673 | 2.050 | 1.52469 | 56.5 | Objective lens |
| 2 | 7.746 | 0.100 |  |  |  |
| 3 | 0.818 | 1.000 | 1.52469 | 56.5 |  |
| 4 | ∞ | 0.100 |  |  |  |
| 5 | ∞ | 0.050 | 1.61949 | 30.0 | Protective layer |
| 6 | ∞ |  |  |  |  |

Aspheric surface coefficient

|  | First surface | Second surface | Third surface |
|---|---|---|---|
| κ | −2.4597E−01 | 2.8559E+01 | −6.4726E−01 |
| A4 | −6.9696E−03 | 5.3905E−02 | 2.6566E−01 |
| A6 | 8.8911E−03 | −5.3196E−03 | −4.7477E−01 |
| A8 | −5.5545E−03 | −5.0480E−02 | 1.6866E+00 |
| A10 | 8.2039E−04 | 7.5481E−03 | −1.4626E+00 |
| A12 | 5.9345E−05 | 4.4929E−03 |  |
| A14 | −1.6375E−04 |  |  |
| A16 | −7.6407E−05 |  |  |
| A18 | 8.4285E−05 |  |  |
| A20 | −2.2669E−05 |  |  |

Diffractive surface coefficient

|  | First surface |
|---|---|
| b2 | −6.0000E−03 |
| b4 | −1.6138E−04 |
| b6 | 9.1977E−05 |
| b8 | 1.8154E−05 |
| b10 | −7.5825E−05 |

In Example 4, it was possible to realize an objective lens that is as light as about 0.02 g (excluding a lens frame) in spite of a two-group-structured high NA lens having a large volume, because the first lens and the second lens were formed with plastic materials. Since the plastic material is the same as that in Example 1, explanation thereof will be omitted here.

Since the longitudinal chromatic aberration was corrected by making the surface of the first lens closer to the light source in Example 4 to be a diffractive surface, it was possible to keep defocus component of wavefront aberration caused by occurrence of mode hopping of +1 nm to be as small as 0.005 $\lambda$rms (calculated value). In this case, a coefficient of the optical path difference function expressing an optical path difference added to transmission wavefront by a diffractive structure was designed so that third order diffracted ray may have the maximum amount of light.

Example 5

Figure 11:
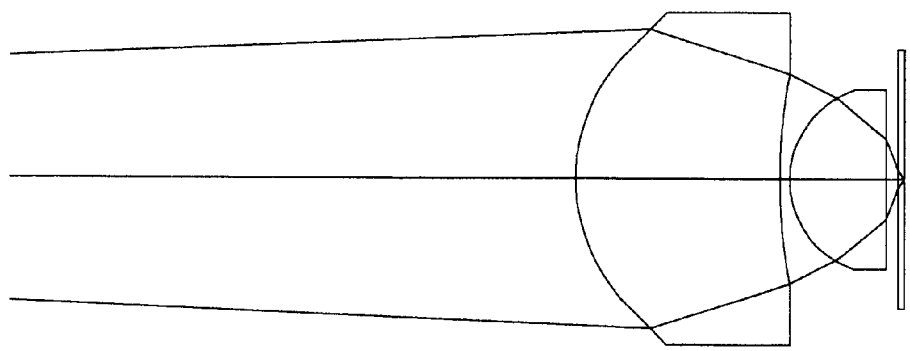
FIG. 11 is a diagram of an optical path relating to Example 5.
Figure 12:
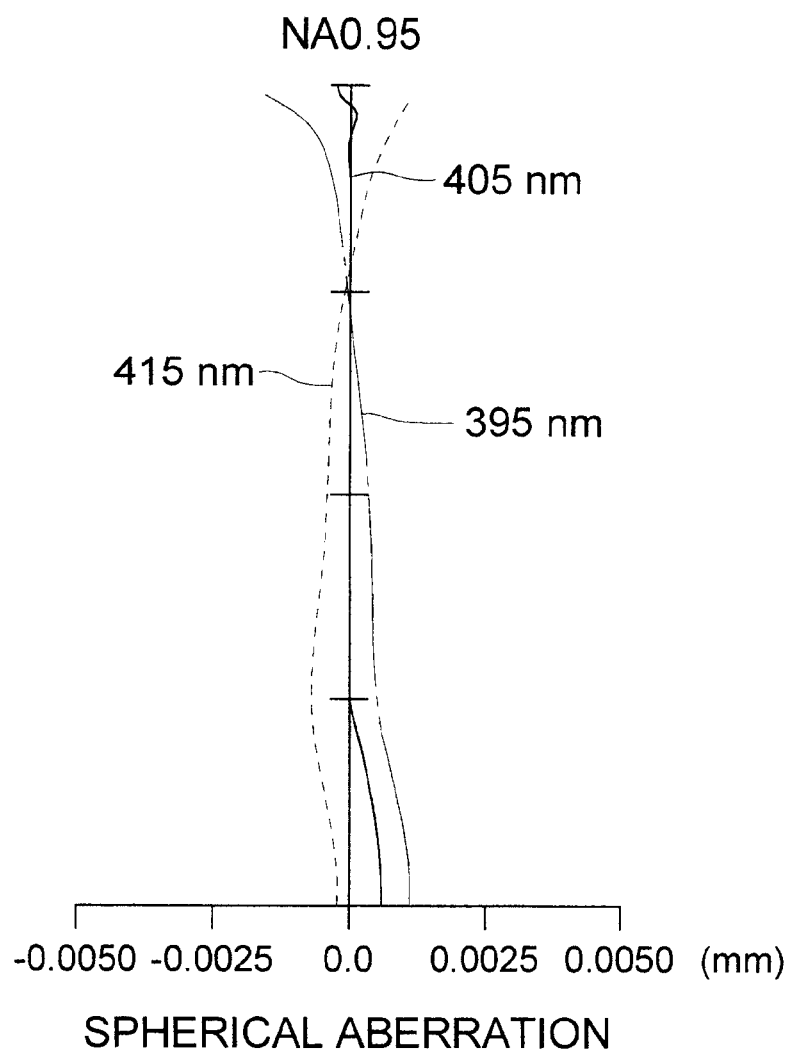
FIG. 12 is a diagram of spherical aberration relating to Example 5.

Example 5 represents a two-group-structured objective lens with f=1.58 mm, NA 0.95, t=0.05 mm, $\lambda$=405 nm and $|m|$=0.04. Lens data of Example 5 are shown in Table 6. FIG. 11 shows an optical path diagram relating to Example 5, and FIG. 12 shows a spherical aberration diagram relating to Example 5.

TABLE 6

Example 5

| Surface No. | r (mm) | d (mm) | Nλ | νd | Remarks |
|---|---|---|---|---|---|
| 0 | | 37.900 | | | Light source |
| 1 | 1.672 | 2.100 | 1.52469 | 56.5 | Objective lens |
| 2 | 9.466 | 0.100 | | | |
| 3 | 0.821 | 1.000 | 1.52469 | 56.5 | |
| 4 | ∞ | 0.120 | | | |
| 5 | ∞ | 0.050 | 1.61949 | 30.0 | Protective layer |
| 6 | ∞ | | | | |

Aspheric surface coefficient

| | First surface | Second surface | Third surface |
|---|---|---|---|
| κ | −2.1864E−01 | −1.2702E+02 | −7.1812E−01 |
| A4 | −8.9968E−03 | 3.6095E−02 | 2.2715E−01 |
| A6 | 5.8496E−03 | 3.8130E−02 | −3.4250E−01 |
| A8 | −3.8981E−03 | −5.8021E−03 | 1.3979E+00 |
| A10 | 7.4165E−04 | −5.5711E−02 | −1.2187E+00 |
| A12 | 7.8469E−05 | 2.4405E−02 | |
| A14 | −6.8788E−05 | | |
| A16 | −6.6828E−05 | | |
| A18 | 5.4506E−05 | | |
| A20 | −1.4400E−05 | | |

Diffractive surface coefficient

| | First surface |
|---|---|
| b2 | −7.8800E−03 |

In Example 5, it was possible to realize an objective lens that is as light as about 0.02 g (excluding a lens frame) in spite of a two-group-structured high NA lens having a large volume, because the first lens and the second lens were formed with plastic materials. Since the plastic material is the same as that in Example 1, explanation thereof will be omitted here.

Since the longitudinal chromatic aberration was corrected by making the surface of the first lens closer to the light source in Example 5 to be a diffractive surface, it was possible to keep defocus component of wavefront aberration caused by occurrence of mode hopping of +1 nm to be as small as 0.002 λrms (calculated value). In this case, a coefficient of the optical path difference function expressing an optical path difference added to transmission wavefront by a diffractive structure was designed so that third order diffracted ray may have the maximum amount of light, and further, the longitudinal chromatic aberration was over-corrected, and a spherical aberration curve of 405 nm and a spherical aberration curve of a longer wavelength and a shorter wavelength were made to cross each other to satisfy the expression (7), thus, there was realized a lens which keeps an excellent wavefront aberration when mode hopping takes place. Though 0.009 mm is for the minimum value of the interval between adjoining diffractive ring-shaped zones in an effective diameter of the objective lens in Example 4 wherein a defocus component of wavefront aberration in the case of mode hopping was properly corrected by correcting also chromatic spherical aberration in addition to the longitudinal chromatic aberration by the use of the higher order optical path difference coefficient in the fourth order or higher, the minimum value of the interval of diffractive ring-shaped zones of the objective lens in the present example is 0.017 mm, which clearly indicates an effect of easing the interval of ring-shaped zones.

Incidentally, amount of change ΔCA of the longitudinal chromatic aberration is indicated by the width of movement of a lower end of the spherical aberration curve for each of 405 nm and 415 nm when the wavelength of the light source is shifted to the long wavelength side by +10 nm, and the direction of the movement is made to be the direction in which the back focus becomes short, by the shift of the wavelength of the light source toward the long wavelength side. Further, amount of change ΔSA of spherical aberration of marginal ray is indicated by the width between the upper end of the spherical aberration curve for 405 nm and the upper end of the spherical aberration curve for 415 nm when the spherical aberration curve for 405 nm is moved in parallel to the position where its lower end is overlapped on the lower end of the spherical aberration curve for 415 nm.

Example 6

Figure 13:
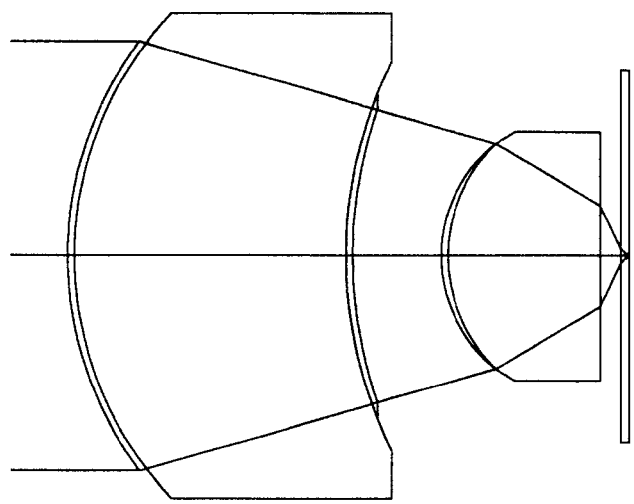
FIG. 13 is a diagram of an optical path relating to Example 6.
Figure 14:
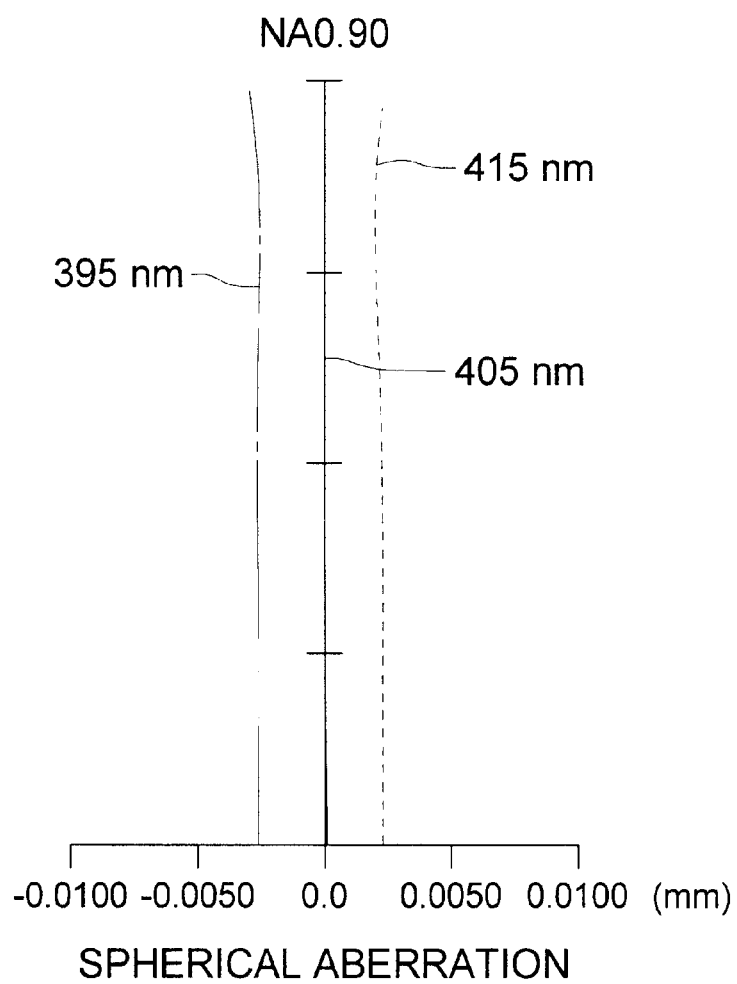
FIG. 14 is a diagram of spherical aberration relating to Example 6.

Example 6 represents a two-group-structured objective lens with f=1.67 mm, NA 0.90, t=0.05 mm, λ=405 nm and |m|=0. Lens data of Example 6 are shown in Table 7. FIG. 13 shows an optical path diagram relating to Example 6, and FIG. 14 shows a spherical aberration diagram relating to Example 6.

TABLE 7

Example 6

| Surface No. | r (mm) | d (mm) | Nλ | νd | Remarks |
|---|---|---|---|---|---|
| 0 | | ∞ | | | Light source |
| 1 | 2.256 | 0.050 | 1.50686 | 57.0 | Objective lens |
| 2 | 2.400 | 1.950 | 1.79900 | 49.6 | |
| 3 | 3.520 | 0.050 | 1.50686 | 57.0 | |
| 4 | 3.501 | 0.600 | | | |
| 5 | 0.963 | 0.030 | 1.50686 | 57.0 | |
| 6 | 1.000 | 1.100 | 1.79900 | 49.6 | |
| 7 | ∞ | 0.150 | | | |
| 8 | ∞ | 0.050 | 1.61949 | 30.0 | Protective layer |
| 9 | ∞ | | | | |

Aspheric surface coefficient

| | First surface | Forth surface | Fifth surface |
|---|---|---|---|
| κ | −1.6013E+00 | 5.0462E+00 | −4.8853E−01 |
| A4 | 8.3574E−03 | 1.6481E−02 | 1.6105E−01 |
| A6 | 5.3312E−03 | −2.5899E−02 | −4.9331E−01 |
| A8 | −2.6939E−03 | −1.4303E−02 | 8.1529E−01 |
| A10 | −2.5155E−04 | 1.0762E−03 | −6.6581E−01 |
| A12 | 3.6194E−04 | −1.0143E−03 | |
| A14 | −1.0213E−04 | | |
| A16 | −1.8827E−06 | | |

In Example 6, the first lens is a hybrid lens in which plastic materials are cemented on both sides of a glass lens, and the second lens is a hybrid lens in which a plastic material is cemented on the surface of a glass lens closer to the light source. By making an optical surface of the plastic material section to be an aspheric surface, coma was corrected subtly. Further, by using a material having a high refractive index represented by nd=1.77250 (TAF 1 made by HOYA Co.), it was possible to suppress an apparent angle (an angle formed between an optical axis and a normal to the second surface at a position where a marginal ray of NA 0.90 passes on) to 50° for the surface of the glass lens in the second lens group.

Example 7

Figure 15:
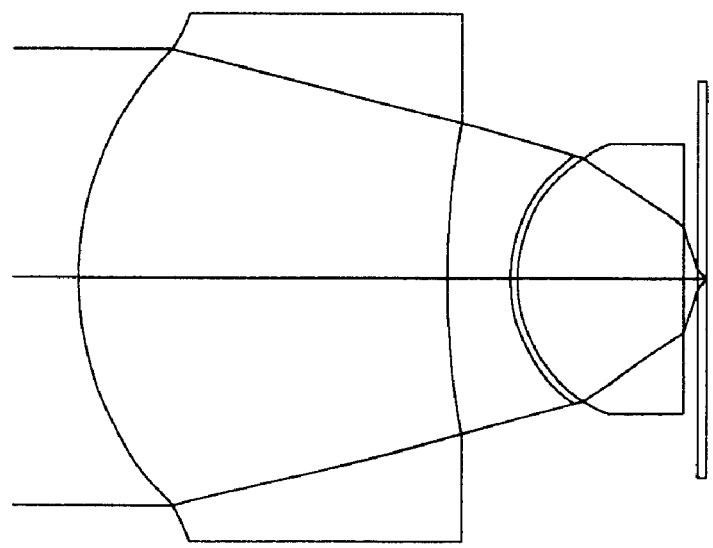
FIG. 15 is a diagram of an optical path relating to Example 7.
Figure 16:
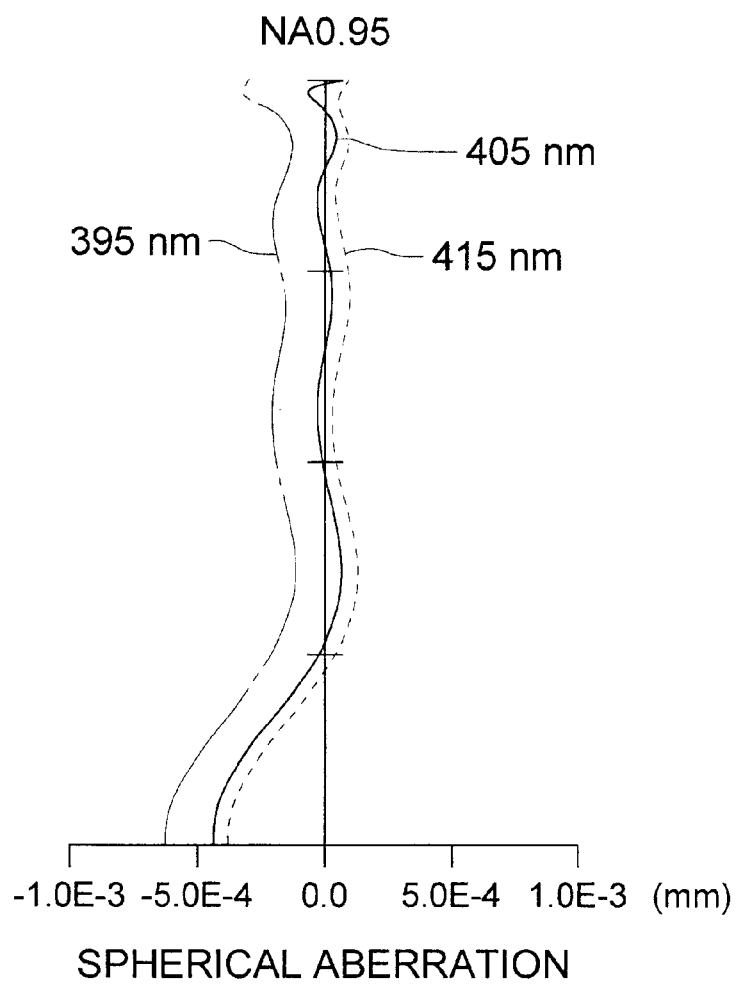
FIG. 16 is a diagram of spherical aberration relating to Example 7.

Example 7 represents a two-group-structured objective lens with f=1.58 mm, NA 0.95, t=0.05 mm, λ=405 nm and |m|=0. Lens data of Example 7 are shown in Table 8. FIG. 15 shows an optical path diagram relating to Example 7, and FIG. 16 shows a spherical aberration diagram relating to Example 7.

TABLE 8

Example 7

| Surface No. | r (mm) | d (mm) | Nλ | νd | Remarks |
|---|---|---|---|---|---|
| 0 | ∞ | | | | Light source |
| 1 | 1.958 | 2.450 | 1.49892 | 70.4 | Objective lens |
| 2 | 4.843 | 0.400 | | | |
| 3 | 0.900 | 0.050 | 1.50686 | 57.0 | |
| 4 | 0.950 | 1.100 | 1.71794 | 55.5 | |
| 5 | ∞ | 0.100 | | | |
| 6 | ∞ | 0.050 | 1.61949 | 30.0 | Protective layer |
| 7 | ∞ | | | | |

Aspheric surface coefficient

| | First surface | Second surface | Third surface |
|---|---|---|---|
| κ | −1.3332E−01 | 5.8300E+00 | −9.1309E−01 |
| A4 | −3.5870E−03 | 9.7869E−03 | 1.0566E−01 |
| A6 | −1.9357E−03 | −5.9931E−03 | 2.1509E−01 |
| A8 | 7.7696E−05 | −2.3992E−02 | −4.8443E−01 |
| A10 | −1.3090E−04 | −7.2116E−03 | 2.4429E−01 |
| A12 | −5.8564E−05 | 1.4314E−02 | |
| A14 | 1.2574E−05 | | |
| A16 | −1.5381E−05 | | |

Diffractive surface coefficient

| | Third surface |
|---|---|
| b2 | −4.5000E−02 |
| b4 | −1.6450E−02 |
| b6 | 2.0069E−03 |
| b8 | −2.5380E−02 |
| b10 | 2.9825E−02 |

In Example 7, the first lens is a glass lens, and the second lens is a hybrid lens in which a plastic material is cemented on the surface of a glass lens closer to the light source. In this case, it was possible to control the wavefront aberration to be as small as 0.002 λrms (calculated value) when the temperature rose from a room temperature (25° C.) to 30° C., by designing appropriately a radius of curvature on the surface of a glass lens representing a base body of the second lens closer to the light source, a thickness on the optical axis for the plastic material section, and a shape of an aspheric surface. In the aforesaid calculation, however, a change in refractive index for a change in temperature of the plastic material was made to be $-12 \times 10^{-5}$/° C., and a change in wavelength for a change in temperature of the light source was made to be +0.05 nm/° C. Further, since the longitudinal chromatic aberration was corrected by making the surface of the plastic material section to be a diffractive surface, it was possible to make the defocus component of the wavefront aberration in the case of mode hopping of +1 nm to be as small as 0.005 λrms (calculated value). In this case, a coefficient of the optical path difference function expressing an optical path difference added to transmission wavefront by a diffractive structure was designed so that the first order diffracted ray may have the maximum amount of light.

Example 8

Figure 17:
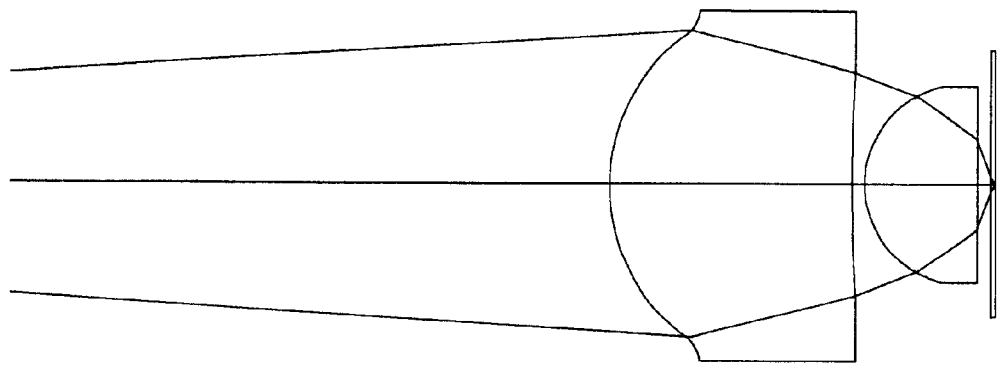
FIG. 17 is a diagram of an optical path relating to Example 8.
Figure 18:
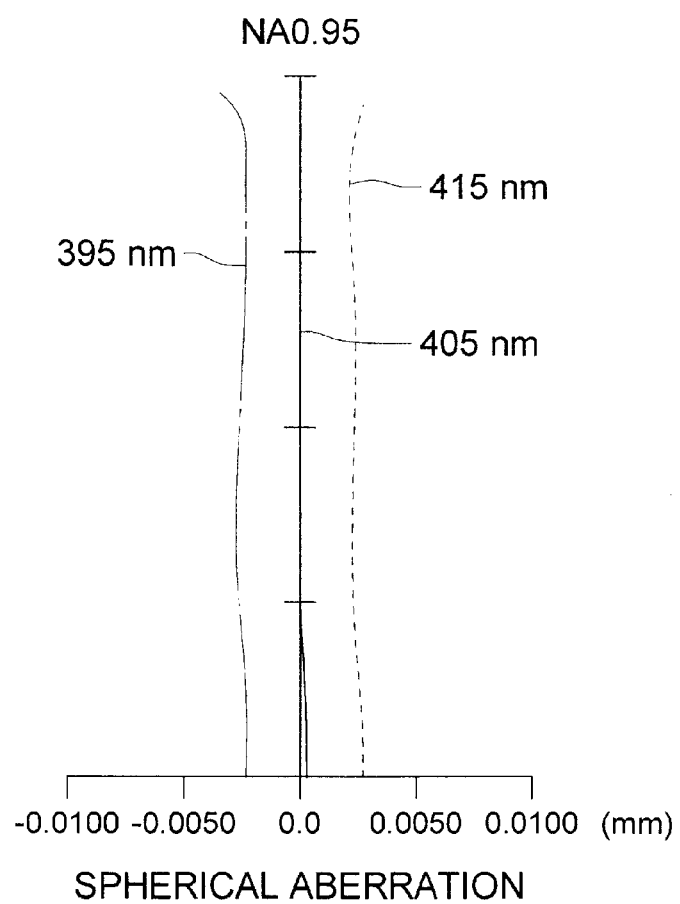
FIG. 18 is a diagram of spherical aberration relating to Example 8.

Example 8 represents a two-group-structured objective lens with f=1.58 mm, NA 0.95, t=0.01 mm, λ=405 nm and |m|=0.07. Lens data of Example 8 are shown in Table 9. FIG. 17 shows an optical path diagram relating to Example 8, and FIG. 18 shows a spherical aberration diagram relating to Example 8.

TABLE 9

Example 8

| Surface No. | r (mm) | d (mm) | Nλ | νd | Remarks |
|---|---|---|---|---|---|
| 0 | | 23.607 | | | Light source |
| 1 | 1.646 | 2.400 | 1.52469 | 56.5 | Objective lens |
| 2 | 12.904 | 0.100 | | | |
| 3 | 0.839 | 1.100 | 1.59966 | 59.5 | |
| 4 | ∞ | 0.150 | | | |
| 5 | ∞ | 0.010 | 1.61949 | 30.0 | Protective layer |
| 6 | ∞ | | | | |

Aspheric surface coefficient

| | First surface | Second surface | Third surface |
|---|---|---|---|
| κ | 1.6256E−01 | 0.0000E+00 | −6.5244E−01 |
| A4 | −1.4313E−02 | 5.1702E−02 | 1.8392E−01 |
| A6 | 5.0357E−03 | −1.1972E−02 | −2.0103E−01 |
| A8 | −5.7938E−03 | −1.7485E−02 | 7.1541E−01 |
| A10 | 1.2028E−03 | 6.9737E−03 | −6.1150E−01 |
| A12 | 4.7099E−05 | −8.6009E−03 | |
| A14 | −1.1896E−04 | 3.7120E−03 | |
| A16 | −8.2031E−05 | | |
| A18 | 6.6887E−05 | | |
| A20 | −1.5902E−05 | | |

In Example 8, it was possible to control an apparent angle on the surface of the second lens closer to the light source to be 58° by making the second lens to be a glass lens (M—BaCD 12 with nd=1.5831 made by HOYA Co.), even for the two-group-structured lens of a finite conjugate type in which the ensured wording distance is as large as 0.15 mm, which makes it possible to process a mold accurately by SPDT. Further, the first lens having a large volume was made to be a plastic lens so that the total weight of the two-group-structured lens may not become too great, which lighten a burden on the actuator for focusing. Since the plastic material is the same as that in Example 1, the explanation therefor will be omitted.

Example 9

Figure 19:
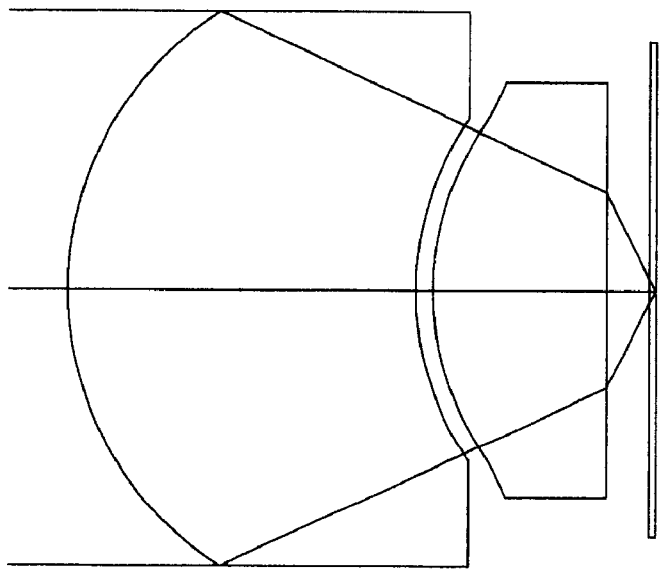
FIG. 19 is a diagram of an optical path relating to Example 9.
Figure 20:
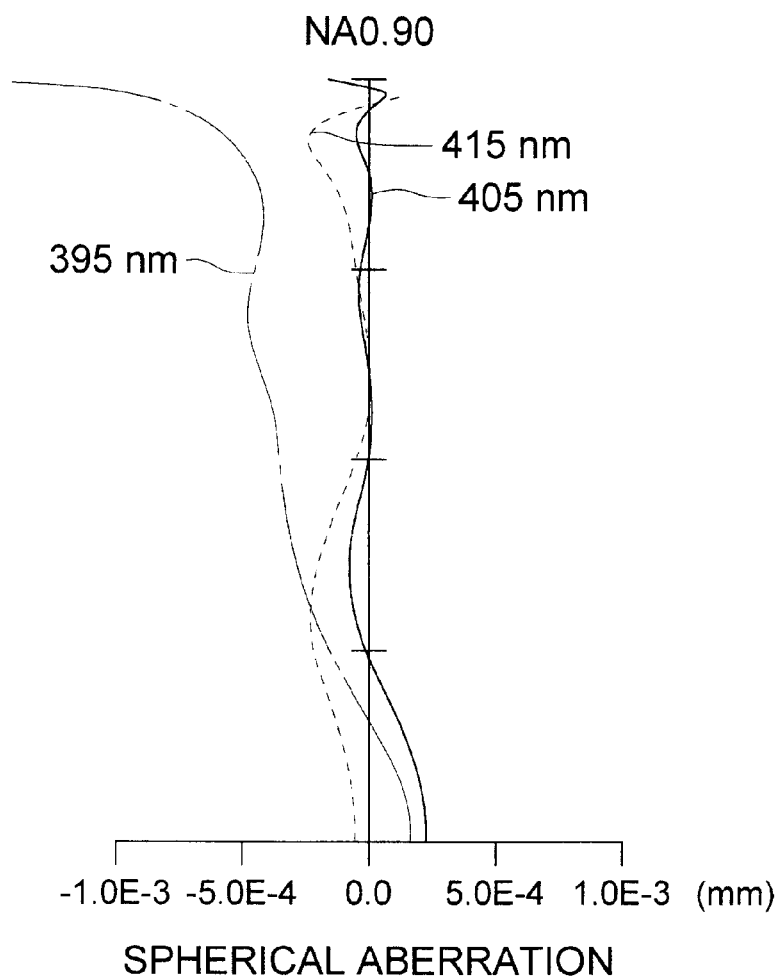
FIG. 20 is a diagram of spherical aberration relating to Example 9.

Example 9 represents a two-group-structured objective lens with f=1.67 mm, NA 0.90, t=0.03 mm, λ=405 nm and |m|=0. Lens data of Example 9 are shown in Table 10. FIG. 19 shows an optical path diagram relating to Example 9, and FIG. 20 shows a spherical aberration diagram relating to Example 9.

TABLE 10

Example 9

| Surface No. | r (mm) | d (mm) | Nλ | νd | Remarks |
|---|---|---|---|---|---|
| 0 | | ∞ | | | Light source |
| 1 | 1.426 | 1.950 | 1.52469 | 56.5 | Objective lens |
| 2 | 1.668 | 0.100 | | | |
| 3 | 1.427 | 0.955 | 2.09005 | 22.7 | |
| 4 | 27.856 | 0.250 | | | |
| 5 | ∞ | 0.030 | 1.61949 | 30.0 | Protective layer |
| 6 | ∞ | | | | |

TABLE 10-continued

Aspheric surface coefficient

| | First surface | Second surface | Third surface |
|---|---|---|---|
| κ | −3.1360E−01 | 0.0000E+00 | 0.0000E+00 |
| A4 | −2.4600E−03 | 1.3430E−01 | 6.4752E−03 |
| A6 | −2.3465E−03 | −1.0820E−01 | −1.8733E−01 |
| A8 | −4.6090E−04 | −9.2808E−02 | 1.8767E−01 |
| A10 | −8.3351E−04 | 3.8798E−02 | −8.5908E−02 |
| A12 | −3.7026E−04 | | |
| A14 | −9.9580E−05 | | |
| A16 | 5.9059E−05 | | |
| A18 | −3.3810E−05 | | |
| A20 | 9.9700E−07 | | |

Diffractive surface coefficient

| | First surface |
|---|---|
| b2 | −5.0000E−03 |
| b4 | −4.2049E−04 |
| b6 | −2.2156E−04 |
| b8 | 2.5241E−05 |
| b10 | −7.6547E−05 |

In Example 9, the second lens whose apparent angle on the surface closer to the light source tends to be great when a large working distance is ensured was made of $TeO_2$—$B_2O_3$—$Al_2O_3$ type telluride glass whose refractive index for d line is 2.0013. It was therefore possible to control an apparent angle on the surface of the second lens closer to the light source to 29°, which makes it possible to process a mold accurately by SPDT. Further, the first lens having a large volume was made to be a plastic lens so that the total weight of the two-group-structured lens may not be too great, which makes it possible to lighten a burden on the actuator for focusing. Since the plastic material is the same as that in Example 1, the explanation therefor will be omitted.

Since Abbe's number of telluride glass for the second lens in Example 9 is 22.7, longitudinal chromatic aberration is caused greatly, compared with an occasion where ordinary optical glass is used. Therefore, longitudinal chromatic aberration was corrected by making the surface of the first lens closer to the light source to be a diffractive surface, and thereby, the defocus component of wavefront aberration in the case of occurrence of mode hopping of +1 nm was controlled to be as small as 0.006 λrms (calculated value). In this case, a coefficient of the optical path difference function expressing an optical path difference added to transmission wavefront by a diffractive structure was designed so that the fifth order diffracted light may have the maximum amount of light.

Example 10

Figure 21:
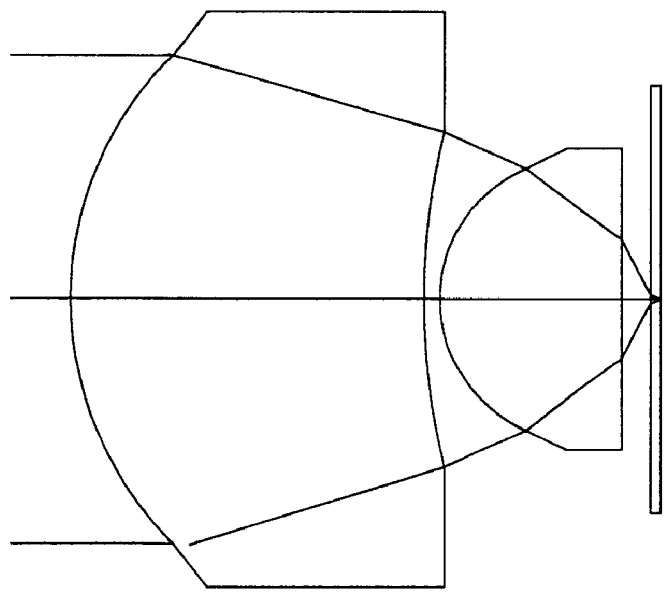
FIG. 21 is a diagram of an optical path relating to Example 10.
Figure 22:
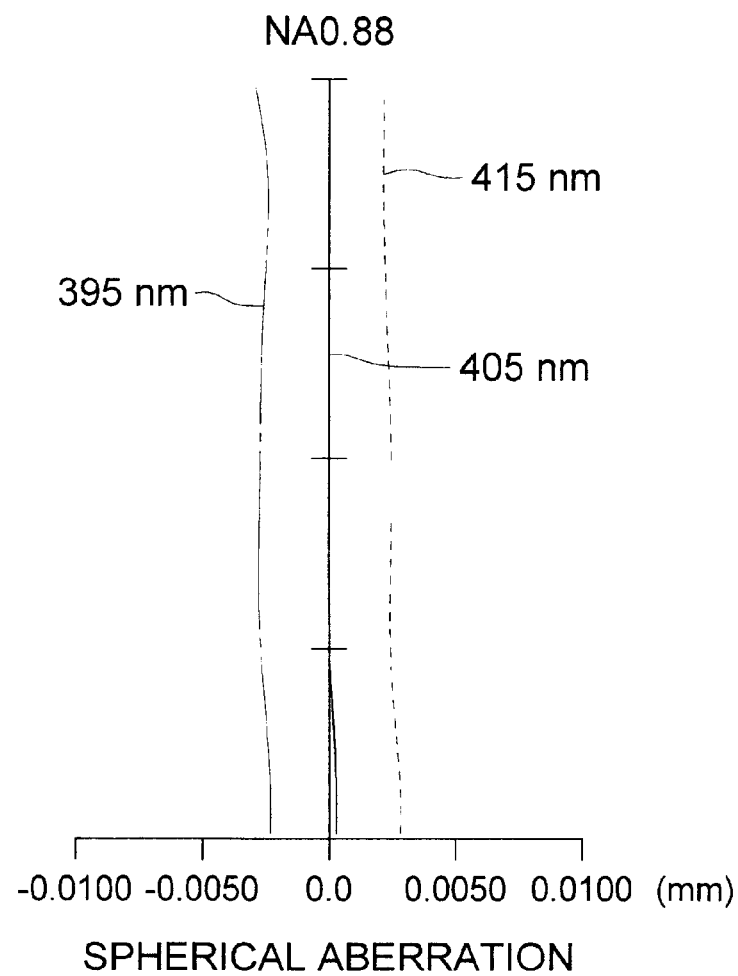
FIG. 22 is a diagram of spherical aberration relating to Example 10.

Example 10 represents a two-group-structured objective lens with f=1.70 mm, NA 0.88, t=0.08 mm, λ=405 nm and |m|=0. Lens data of Example 10 are shown in Table 11. FIG. 21 shows an optical path diagram relating to Example 10, and FIG. 22 shows a spherical aberration diagram relating to Example 10.

TABLE 11

Example 10

| Surface No. | r (mm) | d (mm) | Nλ | vd | Remarks |
|---|---|---|---|---|---|
| 0 | ∞ | | | | Light source |
| 1 | 1.903 | 2.250 | 1.52469 | 56.5 | Objective lens |
| 2 | 7.424 | 0.100 | | | |
| 3 | 0.847 | 1.100 | 1.52469 | 56.5 | |
| 4 | ∞ | 0.200 | | | |
| 5 | ∞ | 0.080 | 1.61949 | 30.0 | Protective layer |
| 6 | ∞ | | | | |

Aspheric surface coefficient

| | First surface | Second surface | Third surface |
|---|---|---|---|
| κ | −1.8109E−01 | 0.0000E+00 | −1.1140E+00 |
| A4 | −5.5343E−03 | 2.2669E−02 | 2.3507E−01 |
| A6 | 2.2942E−03 | −1.8405E−02 | −5.9171E−02 |
| A8 | −2.3154E−03 | 2.1686E−02 | 4.0990E−01 |
| A10 | 8.1648E−05 | −2.6401E−02 | −2.4473E−01 |
| A12 | 8.3104E−05 | 7.0680E−03 | 1.7123E−11 |
| A14 | 1.3980E−04 | 1.0319E−02 | |
| A16 | −1.1465E−04 | 1.9063E−09 | |
| A18 | 2.3944E−05 | | |
| A20 | −1.8213E−06 | | |

In Example 10, it was possible to realize an objective lens that is as light as about 0.02 g (excluding a lens frame) in spite of a two-group-structured high NA lens having a large volume, because the first lens and the second lens were formed with plastic materials. Since the plastic material is the same as that in Example 1, explanation thereof will be omitted here.

The objective lens in Example 10 is a lens wherein the working distance of 0.20 mm is secured, and both image height characteristics and sensitivity for errors caused by optical axis shifting between lenses are excellent, although it is the high NA lens with NA 0.88. Further, in the same way as in Example 1, it was possible to realize an objective lens in which the wavefront aberration can be kept to 0.022 λrms (calculated value) and a range of usable temperatures is broad in spite of a high NA plastic lens, even in the case of temperature rise from a room temperature (25° C.) to 30° C., by making a ratio of the working distance to an effective diameter on the first surface of the first lens to be an appropriated value.

Example 11

Figure 23:
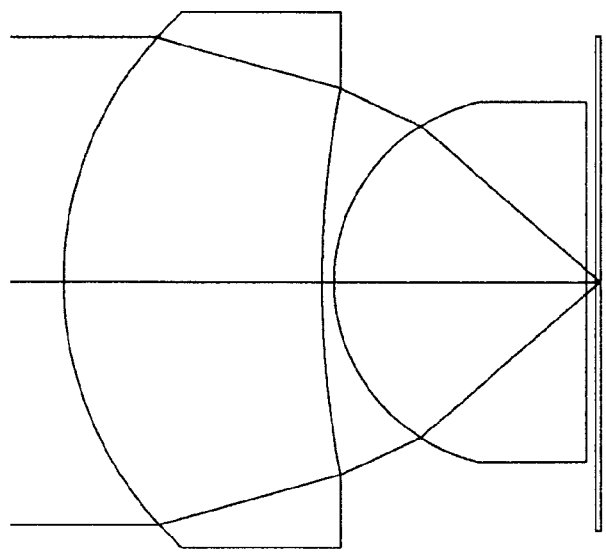
FIG. 23 is a diagram of an optical path relating to Example 11.
Figure 24:
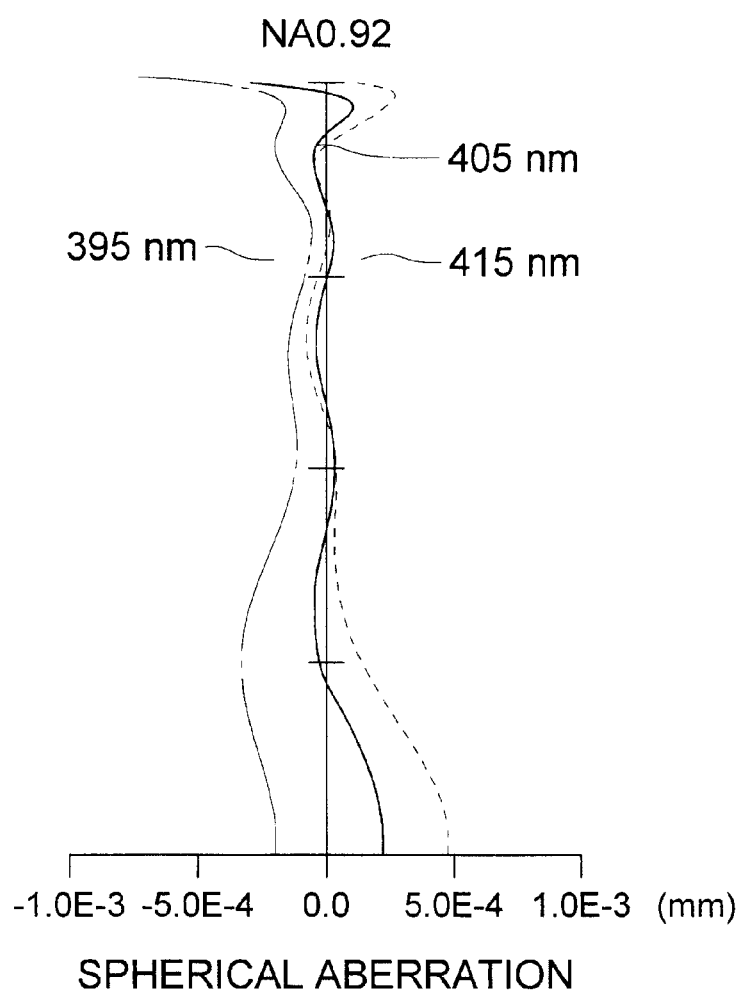
FIG. 24 is a diagram of spherical aberration relating to Example 11.

Example 11 represents a two-group-structured objective lens with f=1.39 mm, NA 0.92, t=0.015 mm, λ=405 nm and |m|=0. Lens data of Example 11 are shown in Table 12. FIG. 23 shows an optical path diagram relating to Example 11, and FIG. 24 shows a spherical aberration diagram relating to Example 11.

TABLE 12

Example 11

| Surface No. | r (mm) | d (mm) | Nλ | vd | Remarks |
|---|---|---|---|---|---|
| 0 | ∞ | | | | Light source |
| 1 | 1.729 | 1.390 | 1.52469 | 56.5 | Objective lens |
| 2 | 6.774 | 0.050 | | | |
| 3 | 0.916 | 1.400 | 1.52469 | 56.5 | |
| 4 | ∞ | 0.055 | | | |
| 5 | ∞ | 0.015 | 1.61950 | 30.0 | Protective layer |
| 6 | ∞ | | | | |

TABLE 12-continued

Aspheric surface coefficient

|     | First surface | Third surface |
| --- | --- | --- |
| κ   | −1.2084E−01 | −7.7231E−01 |
| A4  | 1.3912E−04 | 1.2796E−01 |
| A6  | −7.7595E−03 | 5.1024E−02 |
| A8  | 1.1029E−03 | 1.0527E−01 |
| A10 | 1.3394E−03 | 6.9455E−02 |
| A12 | −4.5279E−03 | |
| A14 | 3.8560E−03 | |
| A16 | −1.1464E−03 | |

Diffractive surface coefficient

|     | Second surface |
| --- | --- |
| b2  | −2.3294E−02 |
| b4  | 1.0353E−02 |
| b6  | −1.6725E−02 |
| b8  | 1.6061E−02 |
| b10 | −6.8413E−03 |

In Example 11, it was possible to realize an objective lens that is as light as about 0.02 g (excluding a lens frame) in spite of a two-group-structured high NA lens having a large volume, because the first lens and the second lens were formed with plastic materials. Since the plastic material is the same as that in Example 1, explanation thereof will be omitted here.

Since the longitudinal chromatic aberration was corrected by making the surface of the first lens closer to an optical information recording medium to be a diffractive surface in Example 11, it was possible to keep defocus component of wavefront aberration caused by occurrence of mode hopping of +1 nm to be as small as 0.003 λrms (calculated value).

Further, by utilizing an aspherical surface-like effect of correcting aberration for the higher order optical path difference function coefficient in fourth order or more, coma caused by optical axis shifting between the first lens and the second lens was finely corrected. In this case, a coefficient of the optical path difference function expressing an optical path difference added to transmission wavefront by a diffractive structure was designed so that the second order diffracted ray may have the maximum amount of light. Incidentally, with regard to the tolerance for each manufacturing error for the objective lens in the present example, it is ±50 μm for optical axis shifting, ±1° for a field angle, and ±5 μm for the optical axis shifting between both lens surfaces of the first lens.

In the design of the high NA objective lens composed of a plurality of lens groups, how to correct spherical aberration while controlling deterioration of wavefront aberration caused by decentering between lens groups in the course of assembling each lens group is important. If the wavefront aberration caused by decentering between lens groups is not corrected, the time required for assembling each lens group is increased, production efficiency for objective lenses is suddenly worsened, and an increase of production cost thereby results. Further, for improving production efficiency for optical pickup apparatuses and for each lens group, it is important to properly correct coma caused by incidence of a diagonal light flux and coma caused by decentering of a lens surface, in the design of an objective lens composed of a plurality of lens groups. In the aforesaid examples 1–5, 8 and 10, the design was carried out by paying attention to the aforesaid points, and thereby, ±20 μm or more of an allowable value for the decentering error of an optical axis between the first lens and the second lens, 0.5° or more of an allowable value for the field angle and ±2 μm or more of an allowable value for decentering of the lens surface were ensured.

In the above-mentioned table or diagram, E (or e) is sometimes used for the expression of an exponent of 10 to express in the way, for example, of E−02 (=$10^{-2}$).

In Table of the lens data of Examples 1 to 11, r is a paraxial radius (mm) of curvature of each surface, d is a distance (mm) between faces, Nλ is a diffractive index for the wavelength of 405 nm, and vd is an Abbe constant at d-line.

(Effect of the Invention)

The invention makes it possible to provide an objective lens for recording and/or reproducing information on an optical information recording medium that is composed of a group of two positive lenses which are light in weight and can be manufactured by injection molding at low cost and on mass production basis, and has a numerical aperture raised to be greater than 0.85.

It is also possible to provide an objective lens for recording and/or reproducing information on an optical information recording medium that is composed of a group of two positive lenses and has a numerical aperture raised to be greater than 0.85, and is used appropriately for an optical pickup apparatus wherein a wavelength of a light source is not more than 500 nm, especially is about 400 nm.

It is further possible to provide an objective lens for recording and/or reproducing information on an optical information recording medium that is composed of a group of two positive lenses, wherein chromatic aberration is properly corrected by a diffractive structure without increasing the number of lenses.

It is further possible to provide an objective lens for recording and/or reproducing information on an optical information recording medium that is composed of a group of two positive lenses which are less affected by scattering caused by tool marks and can be manufactured at low cost, and has a numerical aperture raised to be greater than 0.85.

It is further possible to provide an objective lens for recording and/or reproducing information on an optical information recording medium that is composed of a group of two positive lenses for which a metal mold can be machined accurately by a diamond cutting tool even when a large operating distance is secured, and has a numerical aperture raised to be greater than 0.85.

It is further possible to provide an objective lens for recording and/or reproducing information on an optical information recording medium that is composed of a group of two positive lenses wherein a sufficient operating distance is secured in spite of a small diameter, and has a numerical aperture raised to be greater than 0.85.

It is possible to provide an optical pickup apparatus that is equipped with the objective lens stated above and is capable of recording and reproducing on a high density basis and to provide a recording and/or reproducing apparatus.

What is claimed is:

1. An objective lens for recording and/or reproducing information of an optical information recording medium, comprising:

a first lens group having a positive refractive power; and a second lens group having a positive refractive power, wherein the first and second lens groups are arranged in this order from a light source side of the objective lens and are made of a plastic material respectively; and wherein the following formula is satisfied:

$NA > 0.85$ where NA is a necessary image side numerical aperture for recording or reproducing information of the optical information recording medium, and wherein the following formula is satisfied:

$D_{IN} < 4.5$ mm where $D_{IN}$ is an effective diameter of a light flux incident surface of the first lens group, and
wherein the following formula are satisfied:
in the case that $0.85 < NA < 0.90$, $0.020 < WD/D_{IN} < 0.150$, and
in the case that $NA \geq 0.90$, $0.015 < WD/D_{IN} < 0.120$, where WD is a working distance (mm) of the objective lens.

2. An objective lens for recording and/or reproducing information of an optical information recording medium for use in an optical pickup apparatus comprising a light source having a wavelength of 500 nm or less, the objective lens comprising:
a first lens group having a positive refractive power; and
a second lens group having a positive refractive power, wherein the first and second lens groups are arranged in this order from a light source side of the objective lens; and
wherein the following formula is satisfied:

$NA > 0.85$ where NA is a necessary image side numerical aperture for recording or reproducing information of the optical information recording medium, and wherein the following formula is satisfied:

$D_{IN} < 4.5$ mm where $D_{IN}$ is an effective diameter of a light flux incident surface of the first lens group, and
wherein the following formula are satisfied:
in the case that $0.85 < NA < 0.90$, $0.020 < WD/D_{IN} < 0.150$, and
in the case that $NA \geq 0.90$, $0.015 < WD/D_{IN} < 0.120$, where WD is a working distance (mm) of the objective lens.

3. An objective lens for recording and/or reproducing information of an optical information recording medium, comprising:
a first lens group having a positive refractive power;
a second lens group having a positive refractive power, wherein the first and second lens groups are arranged in this order from a light source side of the objective lens; and a ring-shaped diffractive structure on at least one surface of the objective lens;
wherein the following formula is satisfied:

$NA > 0.85$ where NA is a necessary image side numerical aperture for recording or reproducing information of the optical information recording medium, and wherein the following formula is satisfied:

$D_{IN} < 4.5$ mm where $D_{IN}$ is an effective diameter of a light flux incident surface of the first lens group, and
wherein the following formula are satisfied:
in the case that $0.85 < NA < 0.90$, $0.020 < WD/D_{IN} < 0.150$, and
in the case that $NA \geq 0.90$, $0.015 < WD/D_{IN} < 0.120$, where WD is a working distance (mm) of the objective lens.

4. The objective lens of claim 3, wherein the following formula is satisfied:

$0.5 \leq (vd1+vd2)/(2 \cdot f^2 \cdot NA^2) \cdot \Sigma(-2 \cdot ni \cdot b_{2i} \cdot hi^2) \leq 5.0$ where vd1 is an Abbe constant of d-line of the first lens group,
vd2 is an Abbe constant of d-line of the second lens group,
f is a focal length of a total system of the objective lens in which refractive lenses and the diffractive structure are combined,
$b_{2i}$ is a 2nd order optical path difference function coefficient when the diffractive structure formed on an $i^{th}$ surface is represented by an optical path difference function defined by the formula of $\Phi b = ni \cdot (b_{2i} \cdot hi^2 + b_{4i} \cdot hi^4 + b_{6i} \cdot hi^6 + \ldots)$,
herein, ni is a diffraction order of a diffracted ray having the maximum diffracted-light amount among diffracted rays generated by the diffractive structure formed on the $i^{th}$ surface,
hi is a height (mm) from an optical axis at an effective outermost periphery of the $i^{th}$ surface, wherein the diffractive structure is formed on the $i^{th}$ surface and the effective outermost periphery is a position at where a marginal ray of the necessary image side numerical aperture NA enters, and
$b_{2i}$, $b_{4i}$, $b_{6i}$, ... are 2nd order, $4^{th}$ order, $6^{th}$ order, ... optical path difference function coefficients (or diffractive surface coefficients) respectively.

5. The objective lens of claim 3, wherein the following formula is satisfied:

$0.05 \leq f \cdot \lambda \cdot \Sigma(ni/(Mi \cdot Pi^2)) \leq 0.70$ where $\lambda$ is a wavelength (mm) of the light source,
f is a focal length (mm) of the total system of the objective lens,
ni is a diffraction order of a diffracted ray having the maximum light amount among diffracted rays generated by the diffractive structure formed on the $i^{th}$ surface, Mi is the number of ring-shaped zones of the diffractive structure within an effective diameter of the $i^{th}$ surface, and Pi is the minimum value (mm) of a distance between adjoining ring-shaped zones of the diffractive structure within an effective diameter of the $i^{th}$ surface.

6. The objective lens of claim 3, wherein a light amount of a $ni^{th}$ order diffracted ray generated by the diffractive structure formed on an $i^{th}$ surface is larger than that of any other order diffracted ray and the $ni^{th}$ order diffracted ray generated by the diffractive structure is converged onto an information recording plane of the optical information recording medium so as to conduct recording and/or reproducing information of the optical information recording medium.

7. The objective lens of claim 3, wherein the following formula is satisfied:

$$0.2 \leq |(Ph/Pf)-2| \leq 6.0$$

where Pf is a distance (mm) between adjoining ring-shaped diffractive zones at an image-side numerical aperture necessary for conducting recording and/or reproducing for the optical information recording medium, and Ph is a distance (mm) between adjoining ring-shaped diffractive zones at a numerical aperture half of the image-side numerical aperture necessary for conducting recording and/or reproducing for an optical information recording medium.

8. The objective lens of claim 3, wherein in the case of combining a diffractive action as a diffractive lens and a refractive action as a refractive lens, the objective lens has a longitudinal chromatic aberration characteristic in which a back focal distance changes so as to become shorter when a wavelength of a light source changes to be longer and the following formula is satisfied:

$$-1 < \Delta CA/\Delta SA < 0$$

where $\Delta CA$ represents an amount of a change (mm) of the longitudinal chromatic aberration for a change of the wavelength, and $\Delta SA$ represents an amount of a change (mm) of a spherical aberration of a marginal ray for a change of the wavelength.

9. An objective lens for recording and/or reproducing information of an optical information recording medium, comprising:

a first lens group having a positive refractive power; and a second lens group having a positive refractive power, wherein the first and second lens groups are arranged in this order from a light source side of the objective lens and at least one of the first and second lens groups is a hybrid lens including a glass lens having a refractive action and an optical element in which one surface of the optical element is cemented to the glass lens and the other surface of the optical element is an optical surface made of a plastic material; and wherein the following formula is satisfied:

$$NA > 0.85$$

where NA is a necessary image side numerical aperture for recording or reproducing information of the optical information recording medium.

10. The objective lens of claim 9, wherein the glass lens is a spherical lens.

11. The objective lens of claim 9, wherein the optical surface made of the plastic material is an aspherical surface.

12. The objective lens of claim 9, wherein the optical surface made of the plastic material is a diffractive surface having a ring-shaped diffractive structure.

13. The objective lens of claim 9, wherein the plastic material is a UV adhesives.

14. The objective lens of claim 9, wherein the flowing formula is satisfied:

$$D_{IN} < 4.5 \text{ mm}$$

where $D_{IN}$ is an effective diameter of a light flux incident surface of the first lens group, and wherein the following formula are satisfied:
in the case that $0.85 < NA < 0.90$, $$0.020 < WD/D_{IN} < 0.150,$$

and
in the case that $NA \geq 0.90$, $$0.015 < WD/D_{IN} < 0.120,$$

where WD is a working distance (mm) of the objective lens.

15. The objective lens of claim 14, wherein the following formula are satisfied:
in the case that $0.85 < NA < 0.90$, $$0.050 < WD/D_{IN} < 0.150,$$

and
in the case that $NA \geq 0.90$, $$0.025 < WD/D_{IN} < 0.120.$$

16. An objective lens for recording and/or reproducing information of an optical information recording medium, comprising:

a first lens group having a positive refractive power; and a second lens group having a positive refractive power, wherein the first and second lens groups are arranged in this order from a light source side of the objective lens, one of the first and second lens groups is a glass lens and the other one of the first and second lens groups is a plastic lens; and wherein the following formula is satisfied:

$$NA > 0.85$$

where NA is a necessary image side numerical aperture for recording or reproducing information of the optical information recording medium, and wherein the following formula is satisfied:

$$\rho G > \rho P,$$

where $\rho G$ is a specific a gravity of the glass lens and $\rho G$ is a specific gravity of the plastic lens, wherein a lens group having a larger volume among the first and second lens groups is the plastic lens and the following formula is satisfied:

$$nG > nP,$$

where nG is a refractive index of d-line of the glass lens and nP is a refractive index of d-line of the plastic lens, and wherein a lens group having a larger angle in angle formed between an optical axis and a normal to a surface at a position where a marginal ray passes on a surface positioned most closely to the light source is the glass lens among the first and second lens groups.

17. The objective lens of claim 16, wherein the first lens group is the plastic lens and the second lens group is the glass lens.

18. The objective lens of claim 16, wherein the following formula is satisfied:

$$1.0 < nG/nP < 1.2$$

19. The objective lens of claim 16, wherein the following formula is satisfied:

$$D_{IN} < 4.5 \text{ mm}$$

where $D_{IN}$ is an effective diameter of a light flux incident surface of the first lens group, and wherein the following formula are satisfied:
in the case that $0.85 < NA < 0.90$, $$0.030 < WD/D_{IN} < 0.150,$$

and
in the case that $NA \geq 0.90$, $$0.020 < WD/D_{IN} < 0.120,$$

where WD is a working distance (mm) of the lens.

20. The objective lens of claim 19, wherein the following formula are satisfied:
in the case that $0.85 < NA < 0.90$, $$0.050 < WD/D_{IN} < 0.150,$$

and
in the case that $NA \geq 0.90$, $$0.025 < WD/D_{IN} < 0.120.$$

21. An objective lens for recording and/or reproducing information of an optical information recording medium, comprising:
a first lens group having a positive refractive power; and
a second lens group having a positive refractive power, wherein the first and second lens groups are arranged in this order from a light source side of the objective lens; and
wherein at least one the first and second lens groups is a high refractive index lens made of a material having a refractive index of d-line of 1.8 or more and the following formula is satisfied:

$$NA > 0.85$$

where NA is a necessary image side numerical aperture for recording or reproducing information of the optical information recording medium.

22. The objective lens of claim 21, wherein the material to make the high refractive index lens is a tellurite glass containing $TeO_2$ in an amount of 60 to 95 mol % as a main component.

23. The objective lens of claim 21, wherein the high refractive index lens is made of a single crystal.

24. The objective lens of claim 23, wherein the single crystal is a single crystal selected from a group consisting of $SrNbO_3$, $SrTaO_3$, $CaNbO_3$, $CaTaO_3$, $CaTiO_3$, $KNbO_3$, $KTaO_3$, $BaZrO_3$, $SrZrO_3$, $CaZrO_3$, $K(Ta, Nb)O_3$, $ZnWO_4$, $ZnMo_4$, $CdWO_4$, $CdMo_4$, $PbWO_4$, $Bi_{20}SiO_{12}$, $Bi_{20}GeO_{12}$, $Bi_4Si_3O_{12}$, $Bi_4Ge_3O_{12}$, GaP, GaN, ZnTe, ZnSe, $Cu_3TaSe_4$, ZnS and $(Nax, Bay)(Nbx, Tiy)O_3 (0.35 \leq x \leq 0.40, y=1-x)$.

25. The objective lens of claim 21, wherein the following formula is satisfied:

$$D_{IN} < 4.5 \text{ mm}$$

where $D_{IN}$ is an effective diameter of a light flux incident surface of the first lens group, and wherein the following formula are satisfied:
in the case that $0.85 < NA < 0.90$, $$0.060 < WD/D_{IN} < 0.180,$$

and
in the case that $NA \geq 0.90$, $$0.040 < WD/D_{IN} < 0.150,$$

where WD is a working distance (mm) of the lens.

26. The objective lens of claim 21, wherein the following formula is satisfied:

$$-0.1 \leq (X2-X3)/f/(1+|m|) \leq 0.1$$

where X2 is a difference (mm) in the direction of an optical axis between a plane that is perpendicular to the optical axis and is tangent to the vertex of a surface positioned most closely to the optical information recording medium in the first lens group and a surface positioned most closely to the optical information recording medium in the first lens group at the outermost periphery in an effective diameter (or at a position on a source positioned most closely to the optical information recording medium in the first lens group where a marginal ray at the above NA enters), and it is assumed that X2 takes a positive sign when it is measured in the direction toward the optical information recording medium from the tangent plane that serves as a reference point, and it takes a negative sign when it is measured in the direction toward the light source, X3 is a difference (mm) in the direction of an optical axis between a plane that is perpendicular to the optical axis and is tangent to the vertex of a surface positioned most closely to the light source in the second lens group and a surface positioned most closely to the light source in the second lens group at the outermost periphery in an effective diameter (or at a position on a surface positioned most closely to the light source side in the second lens group where a marginal ray at the above NA enters), and it is assumed that X3 takes a positive sign when it is measured in the direction toward the optical information recording medium from the tangent plane that serves as a reference point, and it takes a negative sign when it is measured in the direction toward the light source, f is a focal length (mm) of a total system of the objective lens, m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture.

27. The objective lens of claim 21, wherein the objective lens comprises a ring-shaped diffractive structure and the following formula is satisfied:

$$0.50 \leq f \cdot \lambda \cdot \Sigma(ni/(Mi \cdot Pi^2)) \leq 3.0$$

where λ is a wavelength (mm) of the light source, f is a focal length (mm) of the total system of the objective lens, ni is a diffraction order of a diffracted ray having the maximum light amount among diffracted rays generated by the diffractive structure formed on the $i^{th}$ surface, Mi is the number of ring-shaped zones of diffractive structure within an effective diameter of the $i^{th}$ surface, and Pi is the minimum value (mm) of the distance between adjoining ring-shaped zones of the diffractive structure within an effective diameter of the $i^{th}$ surface.

28. The objective lens of any one of claims 1, 2, 3, 9, 16, and 21, wherein the following formula is satisfied:

$$0.85 < NA < 0.99$$

29. The objective lens of any one of claims 1, 2, 3, 9, 16, and 21, wherein at least two surfaces among surfaces positioned most closely to the light source in the first lens group, a surface positioned most closely to the optical information recording medium in the first lens group and a surface positioned most closely to the light source in the second lens group are an aspherical surface respectively.

30. The objective lens of any one of claims 1, 2, 3, 9, 16, and 21, wherein a surface positioned most closely to the optical information recording medium is a spherical surface.

31. The objective lens of any one of claims 1, 2, 3, 9, 16, and 21, wherein the following formula is satisfied:

$$|m|=0$$

where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture.

32. The objective lens of any one of claims 1, 2, 3, 9, 16, and 21, wherein the following formula is satisfied:

$$0.01<|m|<0.30$$

where m is a lateral magnification of the objective lens.

33. The objective lens of any one of claims 1, 2, 3, 9, 16, and 21, wherein the following formula is satisfied:

$$0.6 \leq (f1/f2)/(1+|m|) \leq 6.0$$

where f1 is a focal length (mm) of the first lens group and f2 is a focal length (mm) of the second lens group.

34. The objective lens of any one of claims 1, 2, 3, 9, 16, and 21, wherein the following formula is satisfied:

$$-0.3 \leq (X1'-X3')/((NA)^4 f(1+|m|)) \leq 0.2$$

$$X1'=X1 \cdot (N1-1)^3/f1$$

$$X3'=X3 \cdot (N2-1)^3/f2$$

where X1 is a difference (mm) in the direction of an optical axis between a plane that is perpendicular to the optical axis and is tangent to the vertex of a surface positioned most closely to the light source in the first lens group and a surface positioned most closely to the light source in the first lens group at the outermost periphery in the effective diameter (or at a position on a source positioned most closely to the light source in the first lens group where a marginal ray at the above NA enters), and it is assumed that X1 takes a positive sign when it is measured in the direction toward the optical information recording medium from the tangent plane that serves as a reference point, and it takes a negative sign when it is measured in the direction toward the light source, X3 is a difference (mm) in the direction of an optical axis between a plane that is perpendicular to the optical axis and is tangent to the vertex of a surface positioned most closely to the light source in the second lens group and a surface positioned most closely to the light source in the second lens group at an outermost periphery in an effective diameter (or at a position on a surface positioned most closely to the light source in the second lens group where a marginal ray at the above NA enters), and it is assumed that X3 takes a positive sign when it is measured in the direction toward the optical information recording medium from the tangent plane that serves as a reference point, and it takes a negative sign when it is measured in the direction toward the light source, N1 is a refractive index of the first lens group for the used wavelength, excepting that when the first lens group is a hybrid lens, N1 is a refractive index of a glass lens of a base body, N2 is a refractive index of the second lens group for the used wavelength, excepting that when the first lens group is a hybrid lens, N2 is a refractive index of a glass lens of a base body, and f is a focal length (mm) of the total system of the objective lens.

35. The objective lens of any one of claims 1, 2, 3, 9, 16, and 21, wherein the following formula is satisfied:

$$0.4 \leq r1/((N1-1) \cdot f1) \leq 2.0$$

$$0.7 \leq r3/((N2-1) \cdot f2) \leq 2.1$$

where r1 is a paraxial radius of curvature (mm) of a surface positioned most closely to the light source in the first lens group, (excepting that when the first lens group is a hybrid lens, r1 is a paraxial radius of curvature (mm) of a surface positioned most closely to the light source on a glass lens of a base body), r3 is a paraxial radius of curvature (mm) of a surface positioned most closely to the light source in the second lens group, (excepting that when the first lens group is a hybrid lens, r1 is a paraxial radius of curvature (mm) of a surface positioned most closely to the light source on a glass lens of a base body).

36. The objective lens of any one of claims 1, 2, 3, 9, 16, and 21, wherein the spherical aberration of the objective lens is corrected to correspond to a thickness t of a protective layer to protect an information recording plane of the optical information recording medium and satisfies the following formula:

$$0.0 \text{ mm} \leq t < 0.15 \text{ mm}.$$

37. An optical pickup apparatus, comprising:

a light source; and a converging optical system including an objective lens to converge a light flux emitted from the light source onto an information recording plane of an optical information recording medium;

wherein the optical pickup apparatus conducts recording and/or reproducing information of the optical information recording medium by detecting light reflected from the information recording plane, and wherein the optical pickup apparatus comprises the objective lens described in any one of claims 1, 2, 3, 9, 16, and 21 as the objective lens of the converging optical system.

38. A voice and/or image recording and/or voice and/or image reproducing apparatus, comprising:

the optical pickup apparatus described in claim 37.

* * * * *

UNITED STATES PATENT AND TRADEMARK OFFICE
CERTIFICATE OF CORRECTION

PATENT NO. : 6,665,130 B2
DATED : December 16, 2003
INVENTOR(S) : Tohru Kimura

It is certified that error appears in the above-identified patent and that said Letters Patent is hereby corrected as shown below:

Column 37,
Lines 14 and 49, "formula" should read -- formulae --.

Column 38,
Line 16, "formula" should read -- formulae --.
Line 43, "herein," should read -- wherein, --.

Column 40,
Line 7, "adhesives." should read -- adhesive. --.
Line 8, "flowing" should read -- following --.
Lines 15 and 27, "formula" should read -- formulae --.
Line 57, "specific a gravity" should read -- specific gravity --.

Column 41,
Lines 21 and 32, "formula" should read -- formulae --.

Column 42,
Line 14, "formula" should read -- formulae --.

Column 43,
Line 61, "$-0.3 \leq (X1'-X3')/((NA)^4 f(1+|m|)) \leq 0.2$" should read -- $-0.3 \leq (X1' - X3') / ((NA)^4 f(1+|m|)) \leq 0.2$ --.

Signed and Sealed this

Sixth Day of July, 2004

JON W. DUDAS
*Acting Director of the United States Patent and Trademark Office*